(12) United States Patent
Finci et al.

(10) Patent No.: US 12,453,581 B2
(45) Date of Patent: Oct. 28, 2025

(54) HANDHELD GYNECOLOGICAL DEVICE

(71) Applicant: ASPIVIX SA, Epalinges (CH)

(72) Inventors: Julien Finci, Lutry (CH); Jérémie Trommer, Saint Piere en Faucigny (FR)

(73) Assignee: ASPIVIX SA, Renens (CH)

( * ) Notice: Subject to any disclaimer, the term of this patent is extended or adjusted under 35 U.S.C. 154(b) by 279 days.

(21) Appl. No.: 18/252,479

(22) PCT Filed: Nov. 10, 2021

(86) PCT No.: PCT/EP2021/081276
§ 371 (c)(1),
(2) Date: May 10, 2023

(87) PCT Pub. No.: WO2022/101284
PCT Pub. Date: May 19, 2022

(65) Prior Publication Data
US 2024/0008899 A1      Jan. 11, 2024

(30) Foreign Application Priority Data

Nov. 10, 2020   (CH) ........................................ 1441/20

(51) Int. Cl.
*A61B 17/42* (2006.01)
*A61B 17/00* (2006.01)

(52) U.S. Cl.
CPC .... *A61B 17/42* (2013.01); *A61B 2017/00561* (2013.01); *A61B 2017/4225* (2013.01)

(58) Field of Classification Search
CPC ................ A61B 17/4241; A61B 17/42; A61B 2017/4216; A61B 2017/4225;
(Continued)

(56) References Cited

U.S. PATENT DOCUMENTS 4,824,434 A     4/1989  Seitz, Jr.
2007/0179401 A1*  8/2007  Hibner ............... A61B 10/0275
                                                            600/568
(Continued)

FOREIGN PATENT DOCUMENTS

WO        03/009766 A1     2/2003
WO     2020/074369 A1    10/2019
WO     2020/011616 A1     1/2020

OTHER PUBLICATIONS

Written Opinion and International Search Report issued Feb. 22, 2022 in Intl Appl. No. PCT/EP2021/081276.

*Primary Examiner* — Katherine Shi
(74) *Attorney, Agent, or Firm* — MEDLER FERRO WOODHOUSE & MILLS PLLC

(57) ABSTRACT

A handheld gynecological device for cervix handling is disclosed. The device includes a body member defining a vacuum chamber, and a piston member displaceable in the vacuum chamber from a first position to a second position for creating a vacuum in the vacuum chamber. The device includes an actuating member, and a rod member defining a lumen and a suction head. The rod member is fixed relative to the body member when the rod member is coupled thereto. The actuating member is coupled to the body member and/or the rod member and is configured to be switched from a disconnected position, in which the vacuum chamber is fluidly disconnected from the rod member lumen to a connected position, in which the vacuum chamber is fluidly connected to the rod member lumen.

28 Claims, 6 Drawing Sheets

(58) Field of Classification Search
CPC ............ A61B 2017/4233; A61B 17/44; A61B 17/442; A61B 2017/308; A61B 2017/306; A61B 17/30; A61B 1/303; A61B 10/0291; A61B 17/22031; A61B 2017/0042; A61B 2017/00473; A61B 2217/005; A61B 2018/00273; A61B 2018/00291; A61M 2210/1433; A61M 1/81
See application file for complete search history.

(56) References Cited

U.S. PATENT DOCUMENTS

2012/0277742 A1\* 11/2012 Laufer .................. A61B 17/30
606/45
2019/0298382 A1   10/2019 Fung et al.

\* cited by examiner

HANDHELD GYNECOLOGICAL DEVICE

The use of medical instruments to aid during medical procedures and/or medical examinations is common. For instance, grasping devices are often used to handle and/or manipulate organs and/or body tissue of a patient.

For example, many gynecological procedures, such as intra uterine contraception device (IUCD) insertion and removal, uterine tissue swabs for diagnostic purposes, cervix dilatation for uterine cavity curettage and/or for hysteroscopy, and measuring uterine cavity size during surgery, require an instrument to be inserted into the uterine cavity through the cervical canal.

In most anatomical cases, however, the cervical canal is typically angled with respect to the vaginal canal. Thus, prior to being able to perform the gynecological procedure, the cervical canal must be straightened in order to be able to insert an instrument into the uterine cavity.

Thus, for instance, grasping and manipulating the cervix of a patient is essential for performing many gynecological procedures, such as those described above. Hence, prior to performing the procedures, users open the vagina by means of a speculum in order to view the cervix of the patient. Then, the user inserts a grasping device in order to grasp the cervix and straighten the cervical canal to allow an instrument to be inserted into the uterine cavity.

One such grasping device is referred to as a tenaculum. Tenaculums typically have sharp-pointed hooks attached to a scissor-like handle. The cervix is grasped by the ends of the hooks by actuating the scissor-like handle to generate a clamping force. However, this form of grasping device can often be uncomfortable to the patient and can cause pain, bleeding and damage to the tissue of the cervix.

Thus, in recent years the use of vacuum-based grasping devices has been proposed in order to provide a gentler and more comfortable means for grasping the cervix of a patient. For instance, WO 2020/011616 A1 discloses a grasping device comprising a suction head and a handle part connected to each other by a suction tube. The handle part comprises a vacuum pump with a vacuum chamber and a piston having a piston head movably arranged within the vacuum chamber. The vacuum pump further comprises a spring which is compressible by a compressing means and a button for releasing the compression of the spring. Once the suction head is properly placed, the user pushes the button to release the spring in order to generate a vacuum in the vacuum chamber and to grip the cervix.

Moreover, WO 2020/074369 A1 discloses a gynecological device comprising a body part having a vacuum chamber and a rod member having a channel extending from a distal end to a proximal end. The gynecological device further comprises a cervix head arranged at the distal end of the rod member and a sealing mechanism configured to switch between an ambient state and a vacuum state. The sealing mechanism comprises a sleeve element which is axially movable relative to the vacuum chamber to switch the sealing mechanism between the ambient state and the vacuum state. The rod member is displaceable relative to the body member, thereby also axially displacing the sleeve element within the sleeve element to a first position to create a vacuum in the vacuum chamber. The sleeve element is moved further axially to a second position in order to transfer the vacuum from the vacuum chamber to the rod member and thus to the cervix head to grip the cervix.

However, the above-described vacuum-based grasping devices include a plurality of moving parts and are difficult to operate.

Moreover, the operation of known vacuum-based grasping devices can still provide discomfort to the patient. Since the vacuum generating mechanism is often operated as the gynecological device is engaged with the cervix of the patient, the complicated vacuum-generating mechanisms involving a plurality of moving parts can cause forces, such as thrusting forces, to be unintentionally transferred to the cervix by the grasping device as the vacuum mechanism is being activated, potentially causing pain and damage to the tissue of the cervix.

Furthermore, the complicated build of the known vacuum-based grasping devices limits the cost-efficiency of the manufacturing of such grasping devices.

Therefore, it is an object of the invention to provide a gynecological device for cervix handling with an improved means for providing a vacuum for gripping the cervix.

According to a first aspect, this object is achieved by a handheld gynecological device for cervix handling comprising a body member defining a vacuum chamber and having a proximal end and a distal end.

Within the context of the present disclosure, the term "distal" and "distally" is to be understood as referring to a direction away from a user of the device, i.e. a practitioner, and the term "proximal" and "proximally" is to be understood as referring to a direction towards the user of the device. Thus, the distal end of the body member is arranged further from the user than the proximal end of the body member.

The body member may have a wall defining at least a portion of the vacuum chamber. Preferably, the body member is made of a plastic material, which may be transparent. Preferably, the body member may comprise openings at its distal and its proximal end, preferably formed in the wall of the body member.

Furthermore, the body member preferably has a substantially hollow cylindrical shape with a substantially annular-shaped cross-section. Alternatively, the body member may have a cross-sectional shape that is hollow and polygonal, such as a hollow shape with a quadrilateral or pentagonal cross-section. The hollow shape of the body member preferably at least partially forms the vacuum chamber.

The body member may be elongate, having a length preferably ranging from 6 cm to 20 cm, more preferably from 8 cm to 18 cm and having an outer diameter preferably less than 4 cm, more preferably less than 3 cm.

The body member may be of a one-piece construction. However, alternatively, the body member may be constructed of a plurality of different parts that are connected to each other.

The handheld gynecological device further comprises a piston member being at least partially received in the vacuum chamber and configured such that at least a portion of the piston member is displaceable in the vacuum chamber from a first position to a second position for creating a vacuum in the vacuum chamber. Preferably, the piston member can be displaced axially from the first position to the second position along a longitudinal axis of the body member. The piston may be configured to be manually operable by the user of the device. The piston could also be referred to as a "plunger" in the context of the present disclosure.

The piston member may have a wall defining an outer surface of the piston member. Furthermore, the piston member may be hollow such that the wall may also define an inner surface of the piston member.

The piston member preferably is substantially hollow cylindrical with a substantially annular-shaped cross-section in at least a section of the piston member.

Preferably, the shape and dimensions of the piston member, such as its outer diameter, may be configured such that the piston member can be slidably displaced within the vacuum chamber to generate a vacuum in the vacuum chamber.

Thus, when the piston member is in the first position, e.g. when the piston member is inserted at the furthest possible distal position in the vacuum chamber, a large section of the piston member, preferably at least 60%, more preferably at least 80% of a total length of the piston member, may be arranged in the vacuum chamber. However, in the first position, a section of the piston member may extend through an opening at the proximal end of the body member out of the vacuum chamber. The section extending through the opening in the first position may provide a gripping portion, for instance for a user to grip and pull the piston member such that the piston member can be axially displaced relative to the body member towards the second position.

The gripping portion may comprise a feature which facilitates gripping by the user. For instance, the gripping portion may have a flared form, such as a bell mouth shape, to prevent the piston member from slipping out of the hand of the user or to at least reduce slipping. Moreover, the gripping portion may alternatively or additionally have a roughened or gnarled surface to prevent the piston member from slipping out of the hand of the user or to at least reduce slipping.

Alternatively or additionally, the body member may have a gripping feature, preferably arranged on an outer surface of the body member to facilitate gripping and pulling the piston member such that piston member is axially displaced relative to the body member. For instance, the body member may comprise a handle attached to the outer surface of the body member and extending radially therefrom. Preferably, the handle extends circumferentially around at least a portion of the body member, preferably around the entire circumference of the body member. Alternatively or additionally, the outer surface of the body member may have a roughened or gnarled portion to prevent the body member from slipping out of the hand of the user when gripping and pulling the piston member.

Alternatively or additionally, the piston member may be displaced from the first position to the second position by means of a mechanical element, such as a spring or an electric motor. Thus, for instance, the mechanical element may be actuated by a piston member actuating element which may in turn be activated by the user. Thus, the user may activate the piston member actuating element, for instance a button, which actuates the mechanical element which in turn displaces the piston member from the first position to the second position to generate a vacuum in the vacuum chamber.

The piston member may comprise a sealing structure on at least a portion of a section of the piston member which is arranged in the vacuum chamber when the piston member is in the first position and in the second position. The sealing structure can be arranged in a groove or slot formed around a circumference of the outer surface of the wall of the piston member.

Thus, by displacing the piston member from the first position to the second position relative to the body member, for instance by gripping and pulling the piston member axially along the longitudinal axis of the body member, the air mass in the vacuum chamber can be expanded, thus generating a vacuum within the vacuum chamber.

The handheld gynecological device further comprises a rod member having a proximal end and a distal end. The rod member defines a lumen and is configured to be coupled to the body member.

The rod member may have a wall defining an outer surface and an inner surface, the inner surface preferably defining the lumen of the rod member. The rod member preferably has a substantially hollow cylindrical shape with a substantially annular-shaped cross-section. Alternatively, the rod member may have a cross-sectional shape that is hollow and polygonal, such as a hollow shape with a quadrilateral or pentagonal cross section.

The rod member preferably has openings at its proximal end and/or distal end.

The rod member preferably has a total length ranging from 6 cm to 30 cm, more preferably from 10 cm to 25 cm, most preferably from 12 to 20 cm. Preferably, the rod member has an outer diameter of less than 1.5 cm, more preferably of less than 1 cm.

Furthermore, the rod member preferably is substantially rigid to prevent or at least limit bending of the rod member when grasping and manipulating the cervix of a patient.

The handheld gynecological device further comprises a suction head configured to engage at least a portion of a cervix of a patient. The suction head is fluidly connected to a distal end of the rod member and has a cross-section that is larger than a cross-section of the rod member. The suction head may be C-shaped. The suction head may be integrally formed (e.g., integrally moulded) with the rod member.

The suction head may comprise a wall, preferably extending around at least a portion of a circumference of the suction head and preferably defining a suction lumen. The wall may be concave with respect to the distal direction. Thus, the suction lumen preferably is open in the distal direction. The suction lumen preferably is fluidly connected to the lumen of the rod member.

The wall preferably defines an engaging surface configured to engage at least a portion of the cervix of a patient. Preferably, the suction head comprises a sealing element arranged on at least a portion of the engaging surface such that the sealing element may provide a substantially air-tight seal between the suction head and the portion of the cervix the handheld gynecological device is to be applied to.

Preferably, the position of the rod member along the longitudinal axis of the body member is fixed relative to the body member when the rod member is coupled to the body member. In other words, the rod member cannot be moved relative to the body member along the longitudinal axis of the body member. For example, the rod member and the body member may be manufactured as a single integral part. Alternatively or additionally, a separate connecting member may be arranged between the rod member and the body member which can provide a connection between the rod member and the body member. The rod member may be fixed relative to the body member such that also a rotational movement of the rod member relative to the body member is prevented (e.g., a rotational movement about the longitudinal axis of the rod member and/or about the longitudinal axis of the body member). However, if desired, the rod member and the body member may also be movable with respect to each other, for example movable with respect to each other along the longitudinal axis of the body member and/or rotatable with respect to each other (e.g., rotatable about the longitudinal axis of the rod member and/or about the longitudinal axis of the body member).

Preferably, the device further comprises an actuating mechanism with an actuating member. The actuating member preferably is coupled to the body member and/or the rod member. This preferably is achieved by movably mounting the actuating member to the body member and/or the rod member, for instance by configuring the body member and/or the rod member to receive at least a portion of the actuating member in at least a portion thereof. Alternatively or additionally, the actuating member may be configured such that a portion of the body member and/or the rod member may be received in at least a portion of the actuating member to couple the actuating member to the body member and/or the rod member.

Alternatively, a separate connecting element, to which the actuating member is preferably releasably and/or movably attached, may be arranged between and connected to the rod member and/or the body member.

The actuating member is configured to be switched from a disconnected position, in which the vacuum chamber of the body member is fluidly disconnected from the lumen of the rod member, to a connected position, in which the vacuum chamber of the body member is fluidly connected to the lumen of the rod member.

Thus, the actuating member may provide a mechanism for transferring the vacuum generated in the vacuum chamber by the piston member to the lumen of the rod unit and thus to the suction head. This allows the user to generate a vacuum in the vacuum chamber by displacing the piston member from the first position to the second position in the vacuum chamber prior to placing the suction head onto at least a portion of the cervix of the patient. Thereafter, the suction head can be placed onto at least a portion of the cervix. Thereupon, a vacuum can be provided at the suction head via the lumen of the rod member by switching the actuating member from the disconnected position to the connected position to allow the user to grasp and/or manipulate the cervix of the patient. Thus, at the point of application, i.e. when the suction head is engaged with at least a portion of a cervix of a patient, a vacuum can be generated at the suction head by simply switching the actuating member from the disconnected position to the connected position. Since the rod member is fixed relative to the body member, the rod member and the body member do not have to be moved relative to one another during operation of the actuating member.

For one, this enhances the comfort of the patient during the medical procedure since the suction head can be securely engaged to the cervix of the patient while reducing the risk of movement of the suction head relative to the cervix, for instance caused by relative movement between the body member and the rod member.

Furthermore, this eliminates the need for a plurality of moving parts and facilitates the operation of the device for the user, which enables a more efficient performance of the procedure and a more comfortable experience for the patient.

Moreover, the simple build of the device increases the cost-efficiency of the manufacturing of the device.

Preferably, the device is configured such that the actuating member is retained in the connected position and/or in the disconnected position. In other words, the device preferably switches only from the connected position to the disconnected position and/or from the disconnected position to the connected position upon a force applied onto the actuating member, in particular upon a manual force applied by the user.

The actuating member may comprise at least one sealing element configured and arranged to seal the vacuum chamber from the lumen of the rod member when the actuating member is in the disconnected position. The at least one sealing element may further be configured and arranged to allow fluid connection between the lumen of the rod member and the vacuum chamber of the body member when the actuating member is in the connected position.

The sealing element may prevent or at least reduce air from entering the vacuum chamber and/or the lumen of the rod member (in particular, at the proximal end of the rod member) from the environment when the actuating member is in the connected position to help maintain a vacuum.

The actuating member preferably is switched from the disconnected position to the connected position by displacing the actuating member relative to the body member and/or the rod member. For instance, the actuating member may be displaced by rotating and/or translationally moving the actuating member relative to the body member and/or the rod member.

In the case of a rotational movement of the actuating member, the rotational movement may be a rotation about the longitudinal axis of the body member and/or about the longitudinal axis of the rod member. Alternatively, the rotational movement of the actuating member may be about an axis which does not coincide with the longitudinal axis of the body member and/or the rod member, such as about an axis which extends at an angle to the longitudinal axis of the body member and/or the rod member, preferably about an axis which is perpendicular to the longitudinal axis of the body member and/or the longitudinal axis of the rod member.

In the case of a translational movement of the actuating member, the translational movement may be a movement along the longitudinal axis of the body member and/or along the longitudinal axis of the rod member. Alternatively, the translational movement of the actuating member may be a movement in a direction which extends at an angle to the longitudinal axis of the body member and/or the longitudinal axis of the rod member, preferably in a direction which is perpendicular to the longitudinal axis of the body member and/or the longitudinal axis of the rod member.

Preferably, only a rotational movement or only a translational movement of the actuating member is performed in order to switch the device from the connected to the disconnected position, and/or vice-versa. However, the actuating member may also be switched from the disconnected position to the connected position by a combined rotational and translational movement. For instance, the actuating member may first be rotationally displaced and then translationally displaced, or vice versa, from the disconnected position to the connected position.

Preferably, the actuating member comprises a channel. Preferably, at least a portion of the channel preferably extends substantially longitudinally with respect to the longitudinal axis of the rod member and/or the longitudinal axis of the body member. Alternatively or additionally, at least a portion of the channel may extend at an angle to the longitudinal axis of the rod member and/or the body member, preferably substantially transversely with respect to the longitudinal axis of the rod member and/or the longitudinal axis of the body member.

The channel may comprise a plurality of channel segments, for instance one channel segment may extend in a first direction, preferably substantially longitudinally with respect to the longitudinal axis of the rod member and/or of the body member, and a second channel segment fluidly connected to the first channel segment may extend in a second direction, preferably substantially transversely with respect to the longitudinal axis of the rod member and/or of the body member.

The channel may comprise a plurality of channel sections which are not fluidly connected with each other, at least when the actuating member is in the disconnected position. In this case, the plurality of channel sections may also each comprise a plurality of channel segments. For instance, each channel section may comprise one channel segment which extends in a first direction, preferably substantially longitudinally with respect to the longitudinal axis of the rod member and/or of the body member, and a second channel segment fluidly connected to the first channel segment that may extend in a second direction, preferably substantially transversely with respect to the longitudinal axis of the rod member and/or of the body member. Moreover, it may be the case that only one of the plurality of channel sections comprises a plurality of channel segments while the other channel section or channel sections comprise(s) only one channel segment extending substantially in one direction.

The channel and/or channel segments and/or channel sections may have a substantially constant cross-sectional shape and/or cross-sectional dimension along its extension in the actuating member. Preferably, the cross-sectional shape is circular or semi-circular. However, the channel and/or channel segments and/or channel sections may have a varying cross-sectional shape and/or dimension along at least a portion of their extension in the actuating member. For instance, the channel and/or channel segments and/or channel sections may have a tapered form along at least a portion of its/their extension in the actuating member. Thus, for instance, the dimension of the channel and/or channel segments and/or channel sections may increase and/or decrease along at least a portion of its/their extension in the actuating member.

The actuating member preferably is switchable from the disconnected position to the connected position by being displaced relative to the body member and the rod member such that, in the disconnected position, the channel of the actuating member may be sealed from the vacuum chamber and/or the lumen of the rod member, and, in the connected position, the channel can fluidly connect the vacuum chamber of the body member to the lumen of the rod member.

Thus, the channel of the actuating member may provide a fluid connection to fluidly connect the lumen of the rod member to the vacuum chamber of the body member. Thus, by displacing the actuating member, the channel of the actuating member may also be displaced, thereby selectively fluidly connecting and disconnecting the lumen of the rod member to/from the vacuum chamber of the body member.

In order to seal the channel of the actuating member from the vacuum chamber and/or the lumen of the rod member in the disconnected position, the body member and/or the rod member and/or the actuating member may comprise at least one sealing element which prevents or at least reduces gas transfer between the vacuum chamber and/or the lumen of the rod member.

In one preferred embodiment, the vacuum chamber may be fluidly connectable to the lumen of the rod member by displacing the actuating member axially along the longitudinal axis of the rod member and/or the longitudinal axis of the body member.

Preferably, the vacuum chamber is fluidly connectable to the lumen of the rod member by displacing the actuating member along the longitudinal axis of the rod member and/or the longitudinal axis of the body member in a distal direction, i.e. away from the user. This may make the operation of the handheld gynecological device more intuitive since when the user would like to transfer the vacuum generated in the vacuum chamber to the lumen of the rod member by fluidly connecting the vacuum chamber to the lumen of the rod member, the user would also displace the actuating member in the same direction as the vacuum is to be transferred, i.e. in a distal direction extending from the vacuum chamber to the rod unit. Moreover, a distal movement may avoid the user from inadvertently applying a pulling force to the device.

The longitudinal axis of the body member and the longitudinal axis of the rod member may extend parallel to each other. Preferably, the longitudinal axis of the body member and the longitudinal axis of the rod member are coincident. In both cases, the actuating member can be displaced axially along the longitudinal axis of the rod member and the longitudinal axis of the body member.

However, it is also possible that the longitudinal axis of the body member and the longitudinal axis of the rod member extend at an angle to each other. In this case, the actuating member can be displaced axially along either the longitudinal axis of the rod member or the longitudinal axis of the body member.

In one embodiment, the actuating mechanism may comprise a static member along which at least a portion of the actuating member is slidably arranged. Thus, the static member may provide a mounting and/or a guiding for the actuating member in order to displace the actuating member from the disconnected position to the connected position. Furthermore, the static member may also function as the connecting member that connects the body member to the rod member. As such the static member may fix the position of the rod member relative to the body member, as discussed above.

Preferably, the static member comprises at least one channel formed therein. For instance, the static member may provide a flow channel that is fluidly connectable to the channel of the actuating member in order to fluidly connect the lumen of the rod member to the vacuum chamber of the body member.

At least a portion of the at least one channel formed in the static member preferably extends substantially longitudinally with respect to the longitudinal axis of the rod member and/or the longitudinal axis of the body member. Alternatively or additionally, at least a portion of the channel may extend at an angle to the longitudinal axis of the rod member and/or the longitudinal axis of the body member, preferably substantially transversely with respect to the longitudinal axis of the rod member and/or of the body member.

Moreover, the channel of the static member may comprise a plurality of channel segments, for instance one channel segment may extend in a first direction, preferably substantially longitudinally with respect to the longitudinal axis of the rod member and/or the body member, and a second channel segment fluidly connected to the first channel segment may extend in a second direction, preferably substantially transversely with respect to the longitudinal axis of the rod member and/or the body member.

Furthermore, the channel may comprise a plurality of channel sections which are not fluidly connected with each other, at least when the actuating member is in the disconnected position. In this case, the plurality of channel sections may also each comprise a plurality of channel segments. For instance, each channel section may comprise one channel segment which extends in a first direction, preferably substantially longitudinally with respect to the longitudinal axis of the rod member and/or the longitudinal axis of the body member, and a second channel segment fluidly connected to the first channel segment, which may extend in a second direction, preferably substantially transversely with respect to the longitudinal axis of the rod member and/or the longitudinal axis of the body member. Moreover, it may be the case that only one of the plurality of channel sections comprises a plurality of channel segments while the other channel section or channel sections comprise(s) only one channel segment extending substantially in one direction.

The channel and/or channel segments and/or channel sections may have a substantially constant cross-sectional shape and/or cross-sectional dimension along its/their extension in the actuating member. Preferably, the cross-sectional shape is circular or semi-circular. However, the channel and/or channel segments and/or channel sections may have a varying cross-sectional shape and/or dimension along at least a portion of its/their extension in the actuating member. For instance, the channel and/or channel segments and/or channel sections may have a tapered form along at least a portion of its/their extension in the actuating member. Thus, for instance, the dimension of the channel and/or channel segments and/or channel sections may increase and/or decrease along at least a portion of its/their extension in the actuating member.

Preferably, the channel of the static member is fluidly connectable to the channel formed in the actuating member by sliding the actuating member along the static member.

Preferably, the actuating member can be slid substantially along the longitudinal axis of the rod member and/or the longitudinal axis of the body member along the static member to fluidly connect the channel of the static member to the channel formed in the actuating member.

Thus, by sliding the actuating member substantially along the longitudinal axis of the rod member and/or the longitudinal axis of the body member along the static member, the vacuum chamber can be fluidly connected to the lumen of the rod member and thus to the suction head by fluidly connecting the channel of the static member to the channel formed in the actuating member.

The static member and/or the actuating member may comprise at least one sealing element to prevent or at least reduce a fluid connection between the lumen of the rod member and the vacuum chamber of the body member when the actuating member is in the disconnected position. The sealing element may also prevent or at least reduce air from entering the vacuum chamber and/or the lumen of the rod member (in particular, at the proximal end of the rod member) from the environment when the actuating member is in the connected position to help maintain a vacuum.

Alternatively or additionally, the rod member and/or the body member may comprise at least one sealing element to prevent or at least reduce a fluid connection between the lumen of the rod member and the vacuum chamber of the body member when the actuating member is in the disconnected position. The sealing element may also prevent or at least reduce air from entering the vacuum chamber and/or the lumen of the rod member from the environment when the actuating member is in the connected position to help maintain a vacuum.

The actuating member may be slidably attached to the static member. Alternatively or additionally, the actuating member may be slidably attached to the body member and/or the rod member.

The actuating member preferably has at least one protrusion arranged on at least a portion of an outer surface of the actuating member and extending therefrom to facilitate gripping and sliding of the actuating member by the user.

In one embodiment, the vacuum chamber may be fluidly connectable to the lumen of the rod member by rotating the actuating member relative to the rod member and/or the body member.

Preferably, the vacuum chamber is fluidly connectable to the lumen of the rod member by rotating the actuating member relative to the rod member and/or the body member about the longitudinal axis of the rod member and/or the longitudinal axis of the body member.

Thus, for instance, a channel formed in the actuating member may be rotatably displaced by rotating the actuating member such that the vacuum chamber can be fluidly connected to the lumen of the rod member, and thus to the suction head, by the channel formed in the actuating member. This provides an efficient and reliable means for switching the actuating member from the disconnected to the connected position and/or vice versa. In particular, the actuation by rotation of the actuating member about the longitudinal axis of the rod member and/or the longitudinal axis of the body member minimizes thrust forces along the longitudinal axis of the rod member and/or the longitudinal axis of the body member, thus reducing the risk of discomfort that may be caused to the patient by excessive thrust forces.

Alternatively, the rotational movement of the actuating member may be about an axis which does not coincide with the longitudinal axis of the body member and/or the longitudinal axis of the rod member, such as about an axis which extends at an angle to the longitudinal axis of the body member and/or of the rod member, preferably about an axis which is perpendicular to the longitudinal axis of the body member and/or of the rod member.

Also in this embodiment, the actuating mechanism may comprise a static member having a channel formed in at least a portion thereof. The channel of the static member and the channel of the actuating member preferably are arranged offset relative to each other in the disconnected position. The channel of the static member and the channel of the actuating member preferably are fluidly connectable by rotating the actuating member relative to the rod member and/or the body member.

The term "offset" is to be understood as being arranged apart from one another such that a fluid connection is prevented. Thus, when the channel of the static member and the channel of the actuating member are arranged offset relative to each other in the disconnected position, the channel of the static member and the channel of the actuating member are spaced apart from one another such that the fluid path between the channel of the static member and the channel of the actuating member is interrupted. For instance, the channel of the static member and the channel of the actuating member may be positioned at different distances from the longitudinal axis of the rod member and/or the longitudinal axis of the body member to provide an offset. Alternatively or additionally, such offset may be provided by positioning the channel of the static member and the channel of the actuating member at different rotational positions around the longitudinal axis of the rod member and/or the longitudinal axis of the body member.

Thus, when the channel of the static member and the channel of the actuating member are arranged offset relative to each other in the disconnected position, a fluid connection between the channel of the static member and the channel of the actuating member is prevented. Thus, the vacuum chamber and the lumen of the rod member are also fluidly disconnected in this disconnected position.

By rotating the actuating member relative to the rod member and/or the body member, the channel of the static member and the channel of the actuating member can be fluidly connected, for instance by substantially aligning the channel of the static member with the channel of the actuating member. The vacuum chamber may thereby be connected to the lumen of the rod member. When connected, the channel of the static member and the channel of the actuating member may be coaxial.

This provides a simple and reliable fluid connection to connect the vacuum chamber to the lumen of the rod member to provide a vacuum at the suction head of the handheld gynecological device to efficiently and reliably grasp a portion of a cervix of a patient.

Preferably, the channel of the static member and the channel of the actuating member is fluidly connectable by rotating the actuating member relative to the rod member and/or the body member about an axis that is parallel to the longitudinal axis of the rod member and/or to the longitudinal axis of the body member. This axis may coincide with the longitudinal axis of the rod member and/or with the longitudinal axis of the body member. Alternatively, the rotational movement of the actuating member may be about an axis which is not parallel with the longitudinal axis of the body member and/or the rod member, such as about an axis which extends at an angle to the longitudinal axis of the body member and/or to the longitudinal axis of the rod member, preferably about an axis which is perpendicular to the longitudinal axis of the body member and/or the rod member.

Preferably, the channel of the static member and/or the channel of the actuating member are arranged offset relative to the longitudinal axis of the rod member and/or the longitudinal axis of the body member. Thus, the channel of the static member and/or the channel of the actuating member may be arranged at a distance from the longitudinal axis of the rod member and/or the longitudinal axis of the body member.

Thus, for instance by rotating the actuating member relative to the rod member and/or the body member, preferably about a longitudinal axis of the rod member and/or about a longitudinal axis of the body member, the channel of the static member and the channel of the actuating member may be brought into fluid connection to fluidly connect the vacuum chamber with the lumen of the rod member and thus the suction head when the actuating member is in the connected position.

In one embodiment, the vacuum chamber may be fluidly connectable to the lumen of the rod member by displacing the actuating member relative to the rod member and the body member substantially perpendicular to a longitudinal axis of the rod member and/or a longitudinal axis of the body member.

In particular, the actuation by displacing the actuating member substantially perpendicular to the longitudinal axis of the rod member and/or the longitudinal axis of the body member also minimizes thrust forces along the longitudinal axis of the rod member and/or the longitudinal axis of the body member, thus reducing discomfort caused to the patient by excessive thrust forces.

For example, the actuating mechanism may comprise a static member having a channel formed in at least a portion thereof. The channel of the static member and the channel of the actuating member may be arranged offset relative to each other in the disconnected position. The channel of the static member and the channel of the actuating member may be fluidly connectable by displacing the actuating member relative to the rod member and/or the body member substantially perpendicular to a longitudinal axis of the rod member and/or a longitudinal axis of the body member. Thus, by displacing the actuating member relative to the rod member and/or the body member substantially perpendicular to a longitudinal axis of the rod member and/or a longitudinal axis of the body member the channel of the static member and the channel of the actuating member may be brought into fluid connection to fluidly connect the vacuum chamber with the lumen of the rod member and thus the suction head when the actuating member is in the connected position.

Preferably, the channel of the static member and/or the channel of the actuating member can be arranged offset relative to the longitudinal axis of the rod member and/or the longitudinal axis of the body member.

According to a further aspect of the present invention, the handheld gynecological device comprises a locking mechanism configured to maintain the piston member in the second position. The locking mechanism may thus provide a locking element to lock the piston member in the second position once the piston member has been displaced from the first position to the second position to generate a vacuum in the vacuum chamber. Hence, the piston member is prevented from returning to the first position by the locking mechanism.

Such locking mechanism allows the user to generate the vacuum in the vacuum chamber by pulling the piston member relative to the body member, thereby displacing the piston member from the first position to the second position, and locking the piston member in the second position by the locking mechanism. Then, the user can place the suction head of the handheld gynecological device onto a portion of the cervix of a patient. The cervix of the patient can then be grasped and manipulated, for example by switching the actuating member from the disconnected position to the connected position, thereby transferring the vacuum in the vacuum chamber to the lumen of the rod member and thus to the suction head.

It is understood that the locking mechanism disclosed herein is not dependent on the actuating mechanism also disclosed herein or the position of the rod member relative to the body member being fixed. Thus, the locking mechanism may be implemented in the handheld gynecological device without the presence of the actuating mechanism and vice versa. Thus, for instance, the locking mechanism may be combined with any type of actuating mechanism, including actuating mechanisms not disclosed herein, and may even be provided without any actuating mechanism at all.

In other words, such locking mechanism may be implemented in conjunction with any of the devices described above, in particular in conjunction with any of the more specific features for switching the device from the connected to the disconnected position. However, such locking mechanism may also be implemented independently in any handheld gynecological device comprising a body member defining a vacuum chamber and having a proximal end and a distal end, a piston member being at least partially received in the vacuum chamber and configured such that at least a portion of the piston member is displaceable in the vacuum chamber from a first position to a second position for creating a vacuum in the vacuum chamber, and a rod member having a proximal end and a distal end, wherein the rod member preferably is coupled to the body member, and a suction head configured to engage at least a portion of a cervix of a patient, the suction head being coupled to the distal end of the rod member and having a cross-section that is larger than a cross-section of the rod member.

Preferably, the locking mechanism comprises at least one slot formed in the piston member or the body member. The locking mechanism may further comprise at least one engaging element formed on or attached to the other of the piston member and the body member. Preferably, the engaging element is movably received in the slot.

Thus, the slot and the engaging element may engage with each other in order to guide the piston member from the first position to the second position and/or lock the piston member in the second position.

The piston member and the body member may also each have at least one slot formed therein and may each comprise at least one engaging element formed on or attached thereto. The respective slot formed on one of the piston member and the body member may cooperate with the respective engaging element formed on or attached to the other of the piston member and the body member.

The slot may completely penetrate the entire thickness of a wall of the piston member or the body member at least in a section of the slot. Alternatively or additionally, a section of the slot may penetrate only a portion of the thickness of the wall of the piston member or the body member such that the respective section of the slot is formed as a recess in the respective wall.

Preferably, the slot may comprise a guiding section configured to guide the engaging element when moving the piston member between the first position and the second position. The guiding section may thus allow a guided movement of the piston member from the first position to the second position. This facilitates the movement of the piston member to generate the vacuum in the vacuum chamber since the user does not actively have to guide the piston member from the first position to the second position and thus facilitates engaging the locking mechanism in the second position. Thus, the guiding section guides the piston member from the first position to the second position to ensure the locking mechanism may be securely engaged in the second position.

This provides a reliable and efficient vacuum generating process to enhance the safety, efficiency and patient comfort of the medical procedure.

Preferably, the guiding section extends substantially parallel to a longitudinal axis of the body member. Thus, the piston member may be guided from the first position to the second member in a substantially translational movement, i.e. without any substantial rotation of the piston member. Alternatively or additionally, the guiding section may extend, at least along a portion thereof, in a substantially helical manner.

The locking mechanism may comprise a locking structure providing a stop for the engaging element to maintain the piston member in the second position. The locking structure providing the stop may provide a surface which the engaging element can engage with to prevent the piston member from returning to the first position once the piston member has been displaced to the second position.

Preferably, the locking structure may be formed as a locking section of the slot. The locking section preferably provides an undercut. For example, the locking section preferably extends substantially transversely to the guiding section of the slot and/or in a circumferential direction. The locking structure and the guiding section may be formed as a continuous slot. This enables the piston member to be guided from the first position to the second position. Thereafter, the piston member may be further displaced, for instance by rotating the piston member, in order to engage the engaging element with the locking structure to maintain the piston member in the second position. In other words, the locking section may be formed as a bayonet mount.

Preferably, the locking mechanism is actuated to maintain the piston member in the second position by rotating the piston member relative to the body member to engage the engaging element with the locking structure once the piston member is in the second position.

Thus, once the piston member has been displaced from the first position to the second position, for instance by pulling the piston member substantially longitudinally manually by the user, the piston member can be fixed in the second position by rotating the piston member relative to the body member. By rotating the piston member relative to the body member, the engaging element and the locking structure are thus displaced relative to one another from a disengaged state to an engaged state. In the engaged state, the engaging element and the locking structure prevent the piston member from returning to the first position.

Alternatively or additionally, the engaging element may be insertable into at least a portion of the locking structure in a self-activating manner to engage the engaging element with the locking structure when the piston member is brought to the second position.

For instance, the engaging element and/or the locking structure may be deflectable relative to each other. For instance, as the piston is being displaced to the second position, the engaging element and the locking structure may be configured to contact each other prior to reaching the second position. As a result of a force acting on the engaging element and/or the locking structure resulting from the engaging element contacting the locking structure, the engaging element and/or the locking structure may be deflected and/or biased to allow the engaging element to pass the locking structure. Once the piston member is in the second position, the engaging element and/or the locking structure may at least partially return to its or their original, i.e. non-deflected, position and may retain the piston member in the second position by engagement of the engaging member and the locking structure. Thus, the engaging element may be insertable into at least a portion of the locking structure in a self-activating manner, i.e. without having to actively, for instance by a force exerted by the user, manoeuvre the engaging element to circumvent the locking structure or vice versa.

As opposed to a rigid, i.e. non-deflectable, engaging element and locking structure, in which case the engaging element would have to bypassed by actively moving the piston member or the body member, for instance by means of a force exerted by the user on the piston member or the body member, such an additional movement can be omitted if the engaging element and/or the locking structure are configured to be deflectable. This may be helpful for further reducing the forces exerted on the patient after grasping the cervix, for example rotational forces.

The deflectable engaging element and/or locking structure may be realized, for instance, by configuring the material of the engaging element and/or the locking structure to allow the engaging element and/or the locking structure to bend or deform otherwise. For instance, a protruding tab or arm may be provided.

Alternatively or additionally, the engaging element and/or the locking structure may be provided with a spring, which may allow the engaging element and/or the locking structure to be deflected by compression of the spring as the engaging element and the locking structure contact each other prior to the piston member reaching the second position. Once the piston member is in the second position, the engaging element and/or the locking structure can at least partially return to its or their original, i.e. non-deflected, position by the spring force acting on the engaging element and/or the locking structure.

In other words, the locking mechanism may comprise an undercut (which may be formed, for example, by a recess, an opening, or a protrusion) provided on a first one of the body member and the piston member. The engaging element provided on the other one of the body member or the piston member may be configured to snap into the undercut (e.g., the recess or opening) to lock the relative position of the two members (in particular, to lock the relative position of the two members once sufficient vacuum has been generated in the vacuum chamber). The engaging element may be a deflectable arm, e.g. a cantilever arm, which can be resiliently biased.

Preferably, the engaging element and/or the locking structure are deflectable in a direction that is oblique or substantially perpendicular to a longitudinal axis of the rod member while the piston member is being moved between the first position and the second position.

The handheld gynecological device may further comprise a disengaging actuator that is configured to exert a force on the engaging element. The disengaging actuator preferably is configured to disengage the engaging element from the locking structure, preferably by exerting a force on the disengaging actuator, thereby deflecting the engaging element. The disengaging actuator may thus provide a means for the user to release the locking mechanism such that the piston member may be returned to the first position, for instance after completion of the medical procedure.

Preferably, the engaging element may be deflected in a direction oblique or substantially perpendicular to a longitudinal axis of the rod member to disengage the engaging element.

Alternatively, for example when a bayonet mount is used, the engaging element may be disengageable from the locking structure by rotating the piston member relative to the body member when the piston member is in the second position.

If desired, the locking mechanism may comprise at least two slots formed in the piston member or the body member and preferably at least two engaging elements formed on the other one of the piston member and the body member. This provides for a better guidance of the members when moving them relative to each other. The at least two slots and the at least two engaging elements may be arranged diametrically opposed to each other.

The locking mechanism may also comprise more than two slots, for instance three, four, five or six slots, which may be distributed around the circumference of the piston member or the body member. In this case, preferably the other one of the piston member and the body member comprises the same amount of engaging elements as the number of slots provided, wherein each engaging element may be receivable by one of the slots.

Alternatively, the locking mechanism may comprise more engaging elements than slots, so that at least one of the plurality of slots may be configured to receive at least two or more engaging elements.

Preferably, the rod member is substantially rigid. Substantially rigid is to be understood as providing sufficient stiffness of the rod member such that the rod member does not bend or is otherwise deformed, or is only minimally bent or otherwise deformed, when manipulating the cervix.

Preferably, the longitudinal axis of the rod member and the longitudinal axis of the body member are parallel or coincide with each other.

Preferably, the rod member and/or the body member is substantially hollow cylindrical.

Preferably, the gynecological device has a total length extending in the direction of the longitudinal axis of the rod member. Preferably, when the piston member is in the second position, the total length is 70 cm or less. More preferably, the total length is 60 cm or less. More preferably, the total length is 50 cm or less.

Preferably, the rod member is 5 cm long or more, more preferably 10 cm long or more, or 15 cm or more. Preferably, the rod member is 30 cm long or less, preferably 25 cm long or less. For example, the length of the rod member may be about 19 cm. Such lengths are favourable for inserting the rod member through the vagina of the patient to engage with at least a portion of the cervix while allowing the user to operate the gynecological device, such as by actuating the actuating member.

Thus, depending on the required length of the gynecological device, for instance due to the varying anatomy of patients, the user can adapt the gynecological device according to the situation.

Preferably, the piston member has a total length extending in the direction of the longitudinal axis of the rod member of 16 cm or less, more preferably of 14 cm or less, most preferably of 12 cm or less.

Preferably, the lumen of the rod member is at ambient pressure when the actuating member is in the disconnected position. For example, the handheld gynecological device may further comprise an ambient opening fluidly connected to an ambient environment outside of the gynecological device. Preferably, the lumen of the rod member is fluidly connected to the ambient opening when the actuating member is in the disconnected position. Preferably, the lumen of the rod member can be fluidly disconnected from the ambient opening when the actuating member is in the connected position.

By configuring the handheld gynecological device such that the lumen of the rod member may be fluidly connected to the ambient environment when the actuating member is in the disconnected position and fluidly disconnected from the ambient environment when the actuating member is in the connected position, the vacuum in the lumen of the rod member, and thus the suction, can be released. This allows a simple and comfortable disengagement of the device from the cervix of the patient when the actuating member is switched to the disconnected position. This further enhances the ease of operation of the gynecological device and the safety and comfort of the patient during performance of the medical procedure.

The following list of aspects provides alternative and/or further features of the invention:
1. A handheld gynecological device for cervix handling, comprising:
    a body member defining a vacuum chamber and having a proximal end and a distal end;
    a piston member being at least partially received in the vacuum chamber and configured such that at least a portion of the piston member is displaceable in the vacuum chamber from a first position to a second position for creating a vacuum in the vacuum chamber;
    an actuating mechanism having an actuating member;

a rod member having a proximal end and a distal end, the rod member defining a lumen and being configured to be coupled to the body member;
   wherein the actuating member is coupled to the body member and/or the rod member and is configured to be switched from a disconnected position, in which the vacuum chamber of the body member is fluidly disconnected from the lumen of the rod member, to a connected position, in which the vacuum chamber of the body member is fluidly connected to the lumen of the rod member.
2. The handheld gynecological device according to aspect 1, wherein the actuating member comprises a channel and wherein preferably the actuating member is switchable from the disconnected position to the connected position by being displaced relative to the body member and the rod member such that, in the disconnected position, the channel of the actuating member is sealed from the vacuum chamber and/or the lumen of the rod member, and, in the connected position, the channel fluidly connects the vacuum chamber of the body member to the lumen of the rod member.
3. The handheld gynecological device according to aspects 1 or 2, wherein the vacuum chamber is fluidly connectable to the lumen of the rod member by displacing the actuating member axially along a longitudinal axis of the rod member and/or a longitudinal axis of the body member.
4. The handheld gynecological device according to aspects 2 or 3, wherein the actuating mechanism comprises a static member along which at least a portion of the actuating member is slidably arranged, wherein the static member preferably comprises at least one channel formed therein.
5. The handheld gynecological device according to aspect 4, wherein the channel of the static member is fluidly connectable to the channel formed in the actuating member by sliding the actuating member along the static member.
6. The handheld gynecological device according to aspects 1 or 2, wherein the vacuum chamber is fluidly connectable to the lumen of the rod member by rotating the actuating member relative to the rod member and/or the body member.
7. The handheld gynecological device according to aspect 6, wherein the vacuum chamber is fluidly connectable to the lumen of the rod member by rotating the actuating member relative to the rod member and/or the body member about a longitudinal axis of the rod member and/or a longitudinal axis of the body member or about an axis parallel therewith.
8. The handheld gynecological device according to aspects 2, 6, or 7, wherein the actuating mechanism comprises a static member having a channel formed in at least a portion thereof, wherein preferably the channel of the static member and the channel of the actuating member are arranged offset relative to each other in the disconnected position, wherein preferably the channel of the static member and the channel of the actuating member are fluidly connectable by rotating the actuating member relative to the rod member and/or the body member.
9. The handheld gynecological device according to aspect 8, wherein the channel of the static member and the channel of the actuating member are fluidly connectable by rotating the actuating member relative to the rod member and/or the body member about a longitudinal axis of the rod member and/or about a longitudinal axis of the body member.
10. The handheld gynecological device according to aspects 8 or 9, wherein the channel of the static member and the channel of the actuating member are arranged offset relative to the longitudinal axis of the rod member and/or the longitudinal axis of the body member.
11. The handheld gynecological device according to aspects 1 or 2, wherein the vacuum chamber is fluidly connectable to the lumen of the rod member by displacing the actuating member relative to the rod member and the body member substantially perpendicular to a longitudinal axis of the rod member and/or a longitudinal axis of the body member.
12. The handheld gynecological device according to aspects 2 or 11, wherein the actuating mechanism comprises a static member having a channel formed in at least a portion thereof, wherein preferably the channel of the static member and the channel of the actuating member are arranged offset relative to each other in the disconnected position, wherein preferably the channel of the static member and the channel of the actuating member are fluidly connectable by displacing the actuating member relative to the rod member and/or the body member substantially perpendicular to a longitudinal axis of the rod member and/or a longitudinal axis of the body member.
13. The handheld gynecological device according to aspect 12, wherein the channel of the static member and/or the channel of the actuating member are arranged offset relative to the longitudinal axis of the rod member and/or the longitudinal axis of the body member.
14. The handheld gynecological device according to one of the preceding aspects, further comprising a locking mechanism configured to maintain the piston member in the second position.
15. The handheld gynecological device according to aspect 14, wherein the locking mechanism comprises at least one slot formed in the piston member or the body member and at least one engaging element formed on or attached to the other of the piston member and the body member, wherein preferably the engaging element is movably received in the slot.
16. The handheld gynecological device according to aspect 15, wherein the slot comprises a guiding section configured to guide the engaging element when moving the piston member between the first position and the second position.
17. The handheld gynecological device according to aspect 16, wherein the guiding section extends substantially parallel to a longitudinal axis of the body member.
18. The handheld gynecological device according to any of aspects 15 to 17, wherein the locking mechanism comprises a locking structure providing a stop and/or undercut for the engaging element to maintain the piston member in the second position.
19. The handheld gynecological device according to aspect 18, wherein the locking structure is formed as a locking section of the slot, the locking section preferably extending substantially transversely to the guiding section of the slot and/or in a circumferential direction.
20. The handheld gynecological device according to aspects 18 or 19, wherein the locking mechanism is actuated to maintain the piston member in the second position by rotating the piston member relative to the body member to engage the engaging element with the locking structure once the piston member is in the second position.

21. The handheld gynecological device according to any of aspects 18 to 20, wherein the engaging element is configured to bias the locking structure and the locking structure is configured to elastically recoil in order to engage the engaging element with the locking structure when the piston member is brought to the second position.

22. The handheld gynecological device according to any of aspects 18 to 21, wherein the engaging element and/or the locking structure is deflectable.

23. The handheld gynecological device according to aspect 22, wherein the engaging element and/or the locking structure is deflectable in a direction substantially perpendicular to a longitudinal axis of the rod member, while the piston member is being moved between the first position and the second position.

24. The handheld gynecological device according to any of aspects 18 to 23, further comprising a disengaging actuator configured to disengage the engaging element from the locking structure by exerting a force on the disengaging actuator, thereby deflecting the engaging element.

25. The handheld gynecological device according to aspect 24, wherein the disengaging actuator is deflected in a direction substantially perpendicular to a longitudinal axis of the rod member, to disengage the locking structure from the engaging element.

26. The handheld gynecological device according to any of aspects 18 to 23, wherein the engaging element is disengageable from the locking structure by rotating the piston member relative to the body member when the piston member is in the second position.

27. The handheld gynecological device according to any of aspects 14 to 26, wherein the locking mechanism comprises at least two slots formed in the piston member or the body member and at least two engaging elements formed on the other of the piston member and the body member.

28. The handheld gynecological device according to aspect 27, wherein the at least two slots and the at least two engaging elements are arranged diametrically opposed to each other.

29. The handheld gynecological device according to any of the preceding aspects, wherein the rod member is substantially rigid.

30. The handheld gynecological device according to any of the preceding aspects, wherein the longitudinal axis of the rod member and the longitudinal axis of the body member coincide with each other.

31. The handheld gynecological device according to any of the preceding aspects, wherein the rod member and/or the body member are substantially hollow cylindrical.

32. The handheld gynecological device according to any of the preceding aspects, wherein the gynecological device has a total length extending in the direction of the longitudinal axis of the rod member and wherein, when the piston member is in the second position, the total length is 70 cm or less, more preferably 60 cm or less, more preferably 50 cm or less.

33. The handheld gynecological device according to any of the preceding aspects, further comprising an ambient opening fluidly connected to an ambient environment outside of the gynecological device and wherein the lumen of the rod member is fluidly connected to the ambient opening when the actuating member is in the disconnected position and wherein the lumen of the rod member is fluidly disconnected from the ambient opening when the actuating member is in the connected position.

34. The handheld gynecological device according to any of the preceding aspects, further comprising a suction head configured to engage at least a portion of a cervix of a patient, the suction head being fluidly connected to the distal end of the rod member and having a cross-section that is larger than a cross-section of the rod member.

35. The handheld gynecological device according to any of the preceding aspects, wherein the position of the rod member along the longitudinal axis of the body member is fixed relative to the body member when the rod member is coupled to the body member.

Embodiments of the present invention are further elucidated below with reference to the figures.

Figure 1:
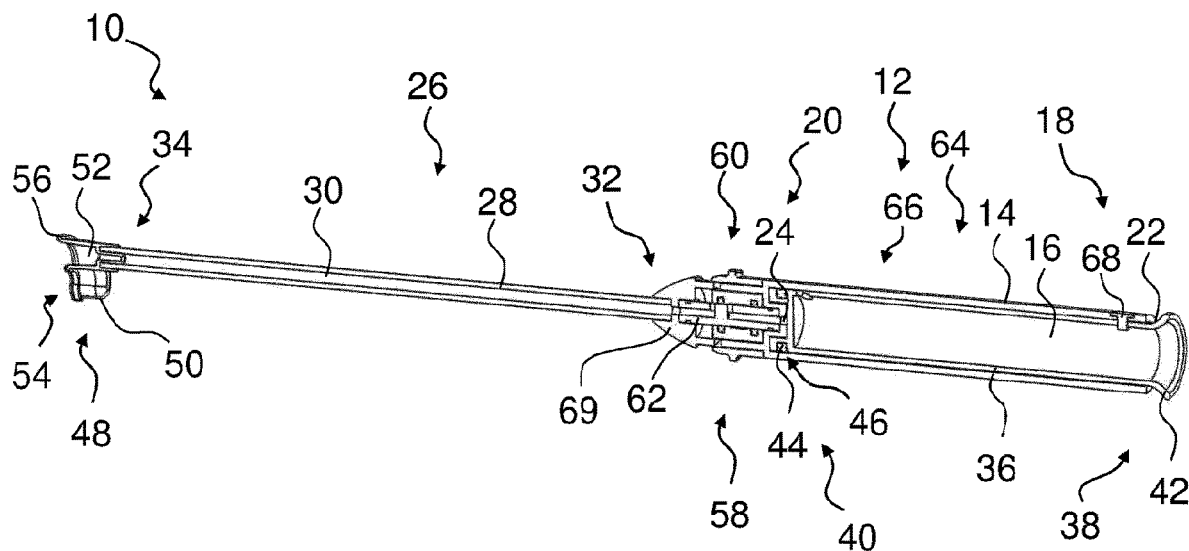
FIG. 1 shows a perspective cross-sectional view of an embodiment according to the invention with an actuating member in a disconnected position.

FIG. 1 shows a handheld gynecological device 10 for cervix handling comprising a body member 12 having a wall 14 defining a vacuum chamber 16 and having a proximal end 18 and a distal end 20. The body member 12 further comprises an opening 22 at its proximal end 18 and an opening 24 at its distal end 20.

The handheld gynecological device 10 further comprises a rod member 26 having a wall 28 defining a lumen 30 and further having a proximal end 32 and a distal end 34.

The handheld gynecological device 10 also comprises a piston member 36 having a proximal end 38 and a distal end 40 and being partially received in the vacuum chamber 16 of the body member 12 such that the proximal end 38 of the piston member 36 extends out of the vacuum chamber 16 through the opening 22 of the body member 12.

At the proximal end 38, the piston member 36 comprises a gripping section 42 having a flared form, similar to a bell mouth, to facilitate gripping the piston member 36 by a user. The piston member 36 further comprises a sealing element 44 arranged in a recess 46 formed at the distal end 40 of the piston member 36.

The piston member 36 is partially received in the vacuum chamber 16 of the body member 12 such that the piston member 36 can be displaced axially along a longitudinal axis of the body member 12 from a first position to a second position to generate a vacuum in the vacuum chamber 16.

In the embodiment shown in FIG. 1, the longitudinal axis of the body member is coincident with a longitudinal axis of the rod member 26. Thus, in this case, the piston member 36 can be displaced axially along the longitudinal axis of the body member 12 and the longitudinal axis of the rod member 26. However, it is also feasible that the longitudinal axis of the body member 12 is not coincident with the longitudinal axis of the rod member 26. For instance, the longitudinal axis of the body member 12 may extend at an angle to the longitudinal axis of the rod member 26. Thus, in this case, the piston member 36 can be displaced axially along a longitudinal axis of the body member 12.

FIG. 1 shows the piston member 36 in the first position, i.e. when the piston member 36 is inserted at the furthest possible distal position in the vacuum chamber 16. To generate a vacuum in the vacuum chamber 16, the user can grasp the piston member 36 at the gripping section 42 and exert a pulling force in a proximal direction to axially move the piston member 36 to the second position, i.e. when the piston member 36 is at its fully or nearly fully extended position in the proximal direction.

As FIG. 1 further shows, the handheld gynecological device 10 further comprises a suction head 48 coupled to the distal end 34 of the rod member 26. The suction head 48 comprises a suction head wall 50 defining a suction head lumen 52 and an engaging surface 54 configured to engage at least a portion of a cervix of a patient. The suction head 48 further comprises a sealing element 56 attached to the engaging surface 54 to provide a substantially fluid-tight seal between the suction head 48 and the portion of the cervix the suction head 48 is applied to. The suction head lumen 52 is in fluid communication with the lumen 30 of the rod member 26.

The suction head 48 may be substantially C-shaped, when viewed in a proximal direction. Moreover, the engaging surface 54 is not arranged in a single plane. Instead, a plurality of sections of the engaging surface 54 are each arranged on different planes. This facilitates engaging the cervix of a patient.

Moreover, the suction head 48 has a cross-section that is larger than a cross-section of the rod member 26, wherein the cross-section is determined based on a cross-sectional view substantially perpendicular to the longitudinal axis of the rod member 26. The larger cross-section is provided by the suction head lumen 52 being larger than the lumen 30 of the rod member 26. This facilitates gripping and manipulating of the cervix of a patient by providing a larger engagement surface.

The handheld gynecological device 10 further comprises an actuating mechanism 58 having an actuating member 60 and a static member 62. The actuating mechanism 58 is shown in more detail in FIGS. 2 and 3.

Furthermore, the handheld gynecological device 10 comprises a locking mechanism 64 comprising a slot 66 formed in the piston member 36 and an engaging element 68 fixed to the wall 14 of the body member 12. The engaging element 68 is thereby partially received in an opening formed in the wall 14 of the body member 12. Alternatively, the engaging element 68 may be formed integrally with the wall 14 of the body member 12. The engaging element 68 is slidably received in the slot 66.

The slot 66 comprises a guiding section 71 extending substantially parallel to the longitudinal axis of the body member 12 and configured to guide the engaging element 68 as the piston member 36 is moved between the first position and the second position. The slot 66 further comprises a locking section 73 providing a locking structure 75 providing a stop or undercut for the engaging element 68 to maintain the piston member 36 in the second position. The locking section 73 may extend substantially transversely to the guiding section 71 along a portion of the circumference of the piston member 36.

In order to fix the piston member 36 in the second position by the locking mechanism 64, the piston member 36 is first displaced from the first position to the second position by exerting a pulling force, for instance by manually pulling on the piston member 36 or by actuating a mechanical element, such as a spring or an electric motor. The engaging element 68 is thereby guided in the guiding section 71 of the slot 66. Once the piston member 36 is in the second position, the piston member 36 can be rotated about an axis, which in the case of the embodiment shown in FIGS. 1 to 3 coincides with the longitudinal axis of the body member 12.

By rotating the piston member 36, the engaging element 68 is received in the locking section 73 of the slot 66. Once the engaging element 68 is received in the locking section 73 of the slot 66, the locking structure 75 prevents the piston member 36 from returning to the first position, thus maintaining the piston member 36 in the second position.

To return the piston member 36 to the first position, the piston member 36 can be rotated in a direction opposite to the direction in which the piston member 36 was rotated to insert the engaging element 68 in the locking section 73 of the slot 66. Thus, the engaging element 68 is released from the locking section 73 of the slot 66 and the piston member 36 can be returned to the first position.

Figure 2:
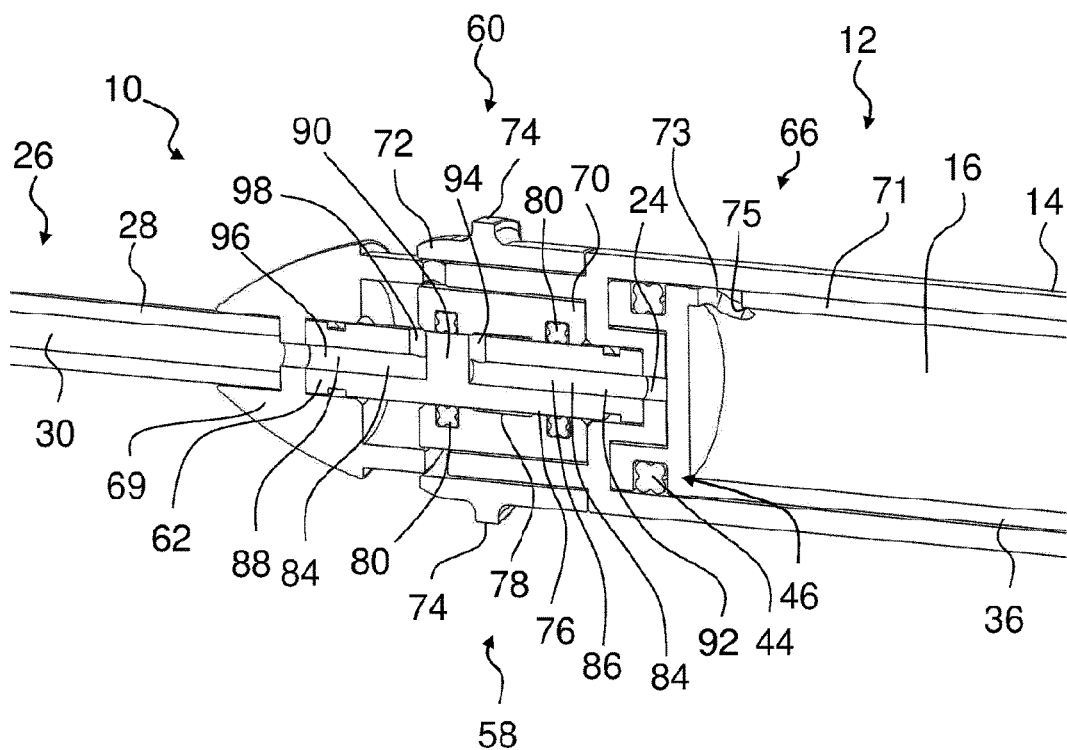
FIG. 2 shows an enlarged view of a detail of FIG. 1.
Figure 3:
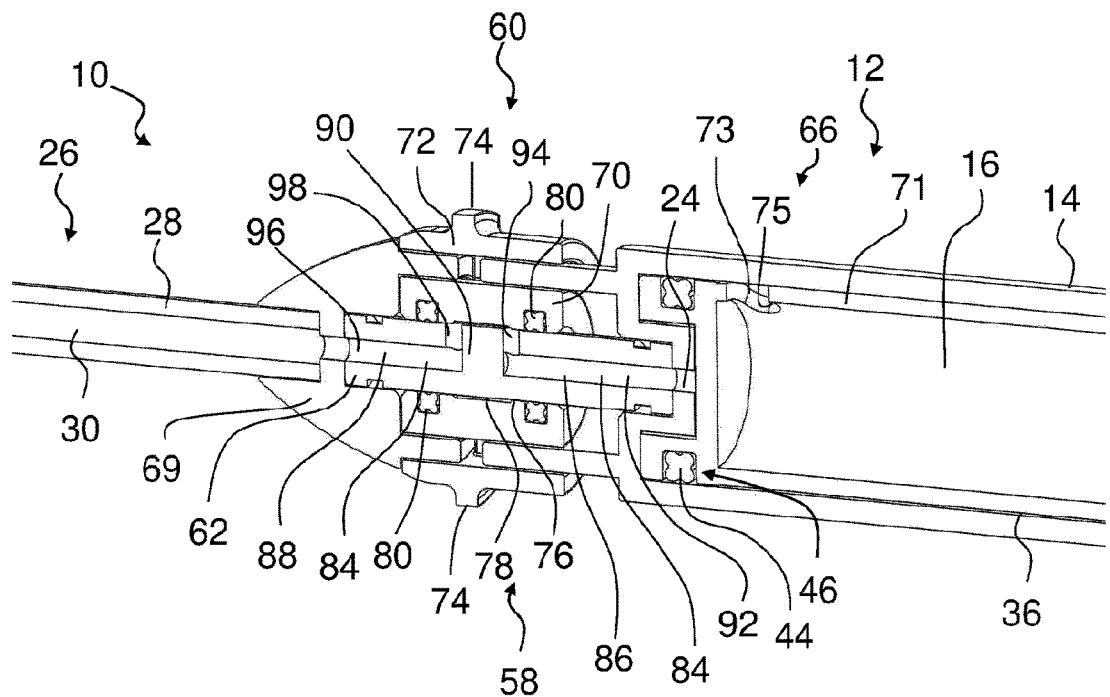
FIG. 3 shows the enlarged view of FIG. 2 with the actuating member in a connected position.

As shown in FIGS. 2 and 3, the actuating member 60 is slidably attached to the static member 62 such that the actuating member 60 can be slid along the static member 62 to switch the actuating member 60 between a disconnected position and a connected position.

The handheld gynecological device 10 further comprises a connecting element 69 which mechanically connects the rod member 26 to the body member 12 via the static member 62.

However, the connecting element 69 may be omitted. In this case, the rod member 26 and the connecting element 69 may be a single integral part. In this case, the body member 12 may be mechanically connected directly to the rod member 26 or it may be formed integrally therewith.

The rod member 26 is configured to be connected to the body member 12. For example, the rod member 26 and the body member 12 may be connected to each other by a material bond, such as by using an adhesive or by using hot air welding, ultrasonic welding, or laser welding to weld the rod member 26 to the body member 12. Other types of permanent or detachable connections may also be used.

The actuating member 60 comprises an inner section 70 and an outer section 72. The inner section 70 is partially received within a portion of the wall 14 of the body member 12, whereas the outer section 72 is arranged outside of the wall 14 of the body member 12. The inner section 70 and the outer section 72 are connected to each other by a connection structure (not shown in FIGS. 2 and 3). Preferably, the connecting structure extends through slots formed in the wall 14 of the body member 12 so that the actuating member 60 can be slid along the wall 14 of the body member 12. The inner and outer sections 70, 72 may be integrally formed with each other.

The outer section 72 of the actuating member 60 provides a gripping portion having one or more (e.g., two) protrusions 74 extending from the outer surface of the outer section 72 to facilitate gripping the outer section 72 and axially displacing the actuating member 60 between the disconnected and the connected positions. The protrusions 74 each extend around a portion of the circumference of the outer section 72. Alternatively, the outer section 72 may have a single protrusion 74 extending around a portion of the circumference of the outer section 72 or around the entire circumference of the outer section 72.

The inner section 70 comprises a channel 76 formed substantially in the center of the inner section 70. The channel 76 has a section 78 with an enlarged diameter compared with other sections of the channel 76. The inner section 70 further comprises two sealing elements 80 that may be arranged in recesses formed in the inner section 70 on opposite sides of the section 78.

The static member 62 comprises a channel 84 having two channel sections 86, 88 fluidly separated from each other by a separation element 90. Each channel section 86, 88 comprises two channel segments 92, 94 and 96, 98. The channel sections 92, 96 extend substantially axially along the longitudinal axes of the body member 12 and/or the rod member 26, whereas the channel sections 94, 98 extend substantially perpendicular to the longitudinal axes of the body member 12 and/or the rod member 26. The channel segments 92 and 94 are fluidly connected to each other and the channel segments 96 and 98 are fluidly connected to each other.

FIG. 2 shows the actuating member 60 in the disconnected position. In this position, the channel sections 86, 88 are not connected to each other via the section 78. Thus, the channel sections 86, 88 are fluidly disconnected.

The sealing elements 80 preferably provide a seal proximally and distally of the channel 86. In this manner, the channel 86 is sealed from the surrounding environment when the actuating member 60 is in the disconnected position. Meanwhile, the proximal aperture of the channel 88 is located distally of the distal one of the sealing elements 80. Therefore, the channel 88 is not fluidly connected with the channel 86. Rather, the channel 88 (and thus the lumen 30 of the rod member 26) is connected with the surrounding environment.

By axially displacing the outer section 72, and thus the inner section 70 as well, from the disconnected position to the connected position in the distal direction, the section 78 with an enlarged diameter is displaced axially, in the illustrative example of FIGS. 1 and 2, distally. In the connected position, as shown in FIG. 3, the section 78 with an enlarged diameter at least partially overlaps with the channel sections 86, 88, thus fluidly connecting said channel sections 86, 88 with each other. In this connected position, the vacuum chamber 16 is fluidly connected to the lumen 30 of the rod member 26 and thus to the suction head 48.

Thus, in the connected position, the vacuum generated in the vacuum chamber 16 by the piston member 36 can be transferred to the lumen 30 of the rod member 26 and thus to the suction head 48 by the actuating mechanism 58 to provide a vacuum to grasp and manipulate the cervix of the patient at the suction head 48.

Since the sealing elements 80 are attached to the inner section 70 on opposite sides of the section 78, the sealing elements 80 are also displaced along with the inner section 70. Thus, in the connected position, the sealing elements 80 are arranged to prevent air from entering into the channels 86, 88 from the environment in order to maintain the vacuum.

Figure 4:
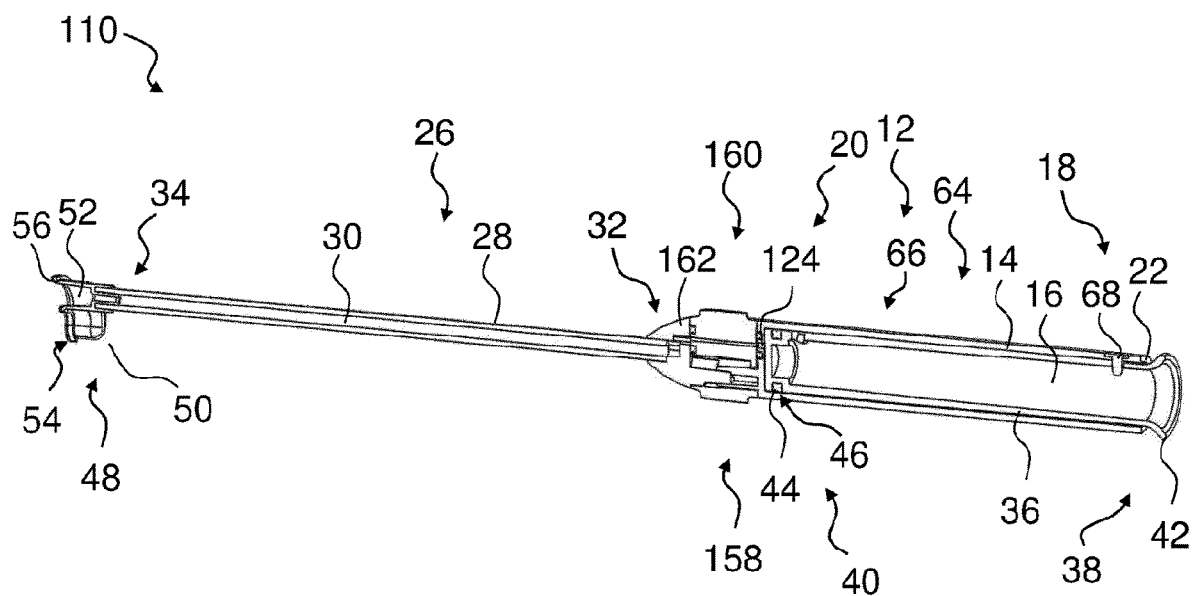
FIG. 4 shows a perspective cross-sectional view of another embodiment according to the invention with the actuating member in the connected position.
Figure 5:
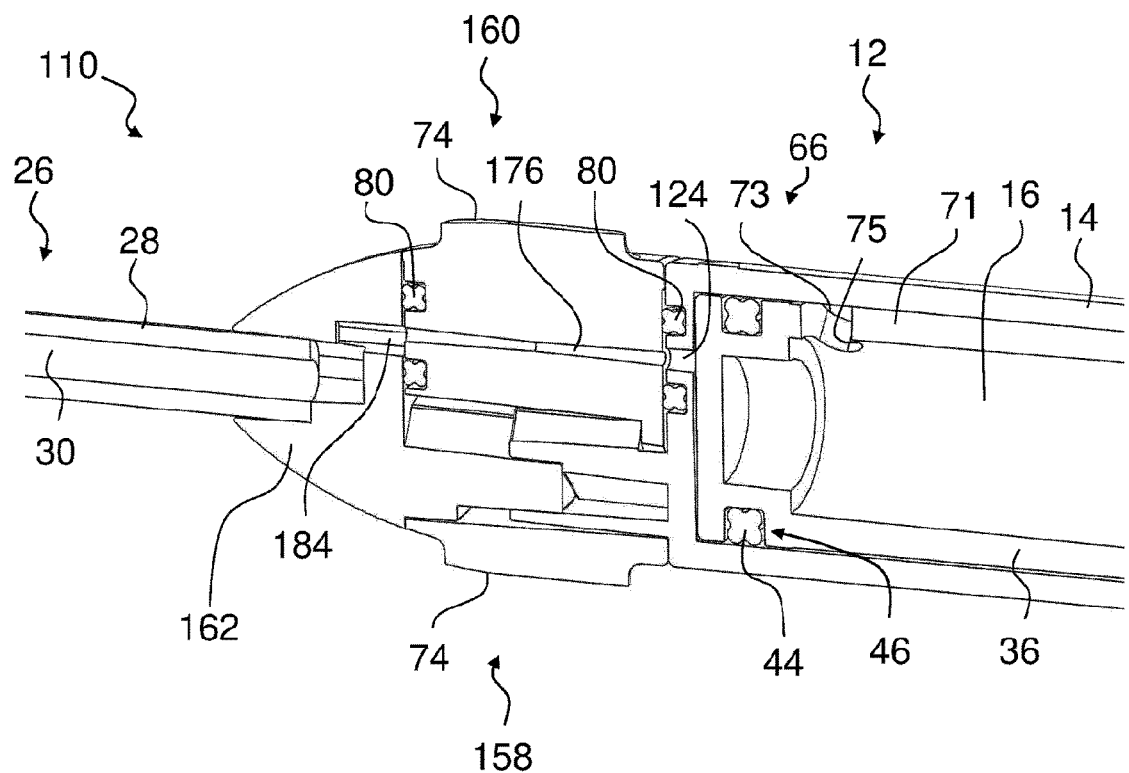
FIG. 5 shows an enlarged view of a detail of FIG. 4.

FIGS. 4 and 5 show a handheld gynecological device 110 according to an alternative embodiment. The embodiment shown in FIGS. 4 and 5 differs from the embodiment shown in FIGS. 1 to 3 mainly in the configuration of the actuating mechanism, which is referenced by the reference sign 158 in FIGS. 4 and 5.

As may be seen in greater detail in FIG. 5, an actuating member 160 comprises a channel 176, which may have a tapered form, extending through the actuating member 160. The channel 176 tapers towards the center of the extension of the channel 176 in a distal direction, i.e. the cross-section of the channel 176 is continuously reduced. In the remaining extension of the channel 176, the cross-section of the channel 176 is continuously increased in a distal direction.

In the embodiment shown in FIGS. 4 and 5, a static member 162 connects the body member 12 to the rod member 26. Furthermore, the static member 162 comprises a channel 184 formed in a section thereof.

As opposed to the embodiment shown in FIGS. 1 to 3, in which the opening 24 formed at the distal end of the body member 12 is arranged centrally, i.e. substantially along the longitudinal axis of the body member 12, the opening 124 formed at the distal end of the body member 12 in the embodiment according to FIGS. 4 and 5 is arranged decentrally, i.e. outside of the longitudinal axis of the body member 12, substantially aligned with the channel 184 formed in the static member 162.

According to the embodiment shown in FIGS. 4 and 5, the actuating member 160 comprises a sealing element 80 arranged in a recess formed in the actuating member 160. Furthermore, the body member 12 also comprises a sealing element 80 arranged in a recess formed at the distal end 20 of the body member 12. The sealing elements 80 are arranged and configured to prevent air from entering into the device 110 from the environment through channels 176, 184 or through opening 124 in order to maintain the vacuum.

In the connected position, which is shown in FIGS. 4 and 5, the channel 176 of the actuating member 160, the channel 184 formed in the static member 162 and the opening 124 of the body member 12 are fluidly connected to each other to provide a fluid connection between the vacuum chamber 16 and the lumen 30 of the rod member 26 and thus to the suction head 48.

In the embodiment shown in FIGS. 4 and 5, the channel 176 of the actuating member 160, the channel 184 formed in the static member and the opening 124 of the body member 12 are substantially aligned with each other in the connected position, as shown in FIGS. 4 and 5. However, it is also feasible to fluidly connect the channel 176 of the actuating member 160, the channel 184 formed in the static member and the opening 124 of the body member 12 without configuring said channels 176, 184 and said opening 124 to be aligned with each other in the connected position. For instance, the opening 124 and the channel 184 may be offset from each other, i.e. not aligned, and the channel 176 may extend at an angle to the longitudinal axis of the body member 12 to fluidly connect the opening 124 and the channel 184 in the connected position to provide a fluid connection between the vacuum chamber 16 and the lumen 30 of the rod member 26 and thus to the suction head 48.

It will also be appreciated that a de-central arrangement of the opening 124 and/or of the channel 184 may be favourable for the construction of the actuating member 160. However, it will be appreciated that also a central arrangement is possible.

To switch the actuating member 160 from the disconnected position to the connected position, the actuating member 160 is rotated substantially about the longitudinal axis of the body member 12 and/or the rod member 26. The channel 176 formed in the actuating member 160 is thereby also rotated substantially about the longitudinal axis of the body member 12 and/or the rod member 26. Thus, as the channel 176 formed in the actuating member 160 fluidly connects the opening 124 of the body member 12 and the channel 184 formed in the static member 162, the actuating member 160 and the channel 176 is rotated substantially about the longitudinal axis of the body member 12 and/or the rod member 26 to fluidly connect the opening 124 of the body member 12 and the channel 184 formed in the static member 162.

As the actuating member 160 is rotated substantially about the longitudinal axis of the body member 12 and/or the rod member 26 from the connected position back to the disconnected position, the channel 176 formed in the actuating member 160 is also rotated such that the channel 176 is no longer in fluid connection with the opening 124 of the body member 12 and the channel 184 formed in the static member 162. In this position, the channel 176 and the channel 184 are arranged offset relative to each other and relative to the longitudinal axis of the rod member 26 and the longitudinal axis of the body member 12.

Thus, in the disconnected position, the vacuum chamber 16 and the lumen 30 of the rod member 26 are not fluidly connected via the opening 124 of the body member 12, the channel 176 of the actuating member 160 and the channel 184 formed in the static member 162.

Figure 6:
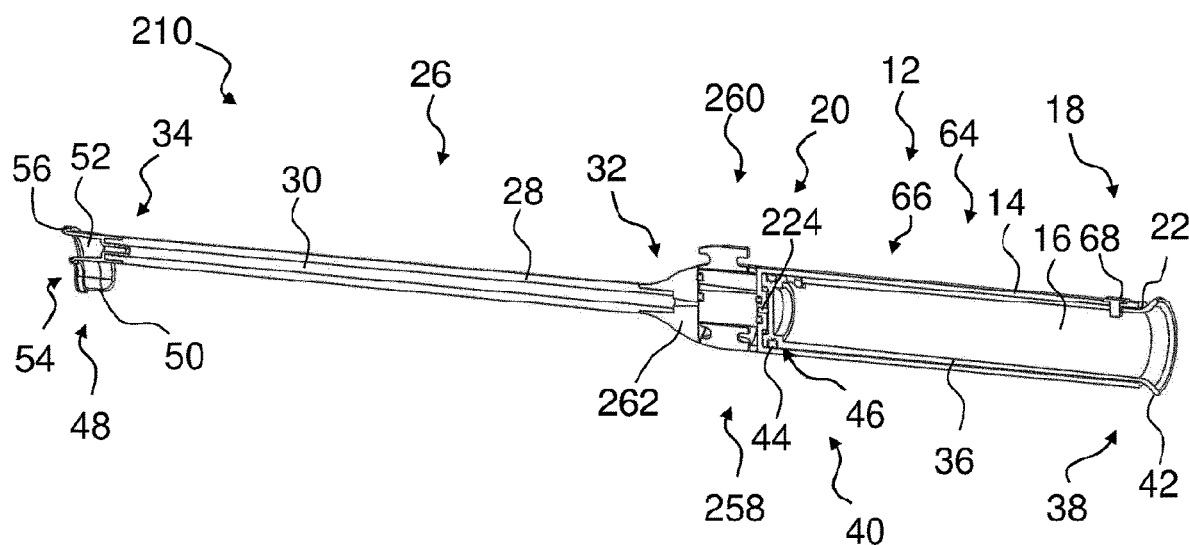
FIG. 6 shows a perspective cross-sectional view of another embodiment according to the invention with the actuating member in the disconnected position.
Figure 7:
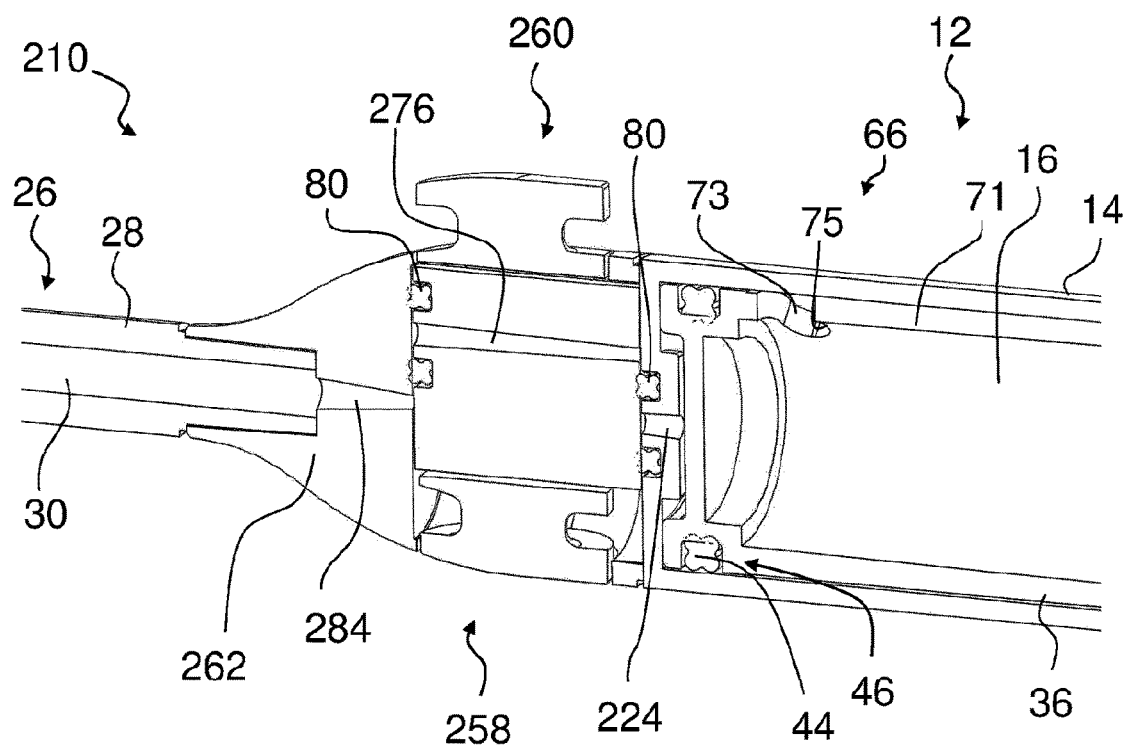
FIG. 7 shows an enlarged view of a detail of FIG. 6.

FIGS. 6 and 7 show an alternative embodiment of the handheld gynecological device 210. The embodiment shown in FIGS. 6 and 7 differs from the embodiments shown in FIGS. 1 to 3 and FIGS. 4 and 5 mainly in the configuration of the actuating mechanism, which is referenced to by the reference sign 258 in FIGS. 6 and 7.

As may be seen in greater detail in FIG. 7, the actuating member 260 comprises a channel 276 extending through the actuating member 260. The channel may have a tapered form in the distal direction.

In the embodiment shown in FIGS. 6 and 7, the static member 262 connects the body member 12 to the rod member 26. Furthermore, the static member 262 comprises a channel 284 formed in a section thereof.

In the disconnected position, which is shown in FIGS. 6 and 7, the channel 276 of the actuating member 260, the channel 284 formed in the static member 262 and the opening 224 of the body member 12 are fluidly connected to each other to provide a fluid connection between the vacuum chamber 16 and the lumen 30 of the rod member 26 and thus to the suction head 48.

In the embodiment shown in FIGS. 6 and 7, the channel 276 of the actuating member 260, the channel 284 formed in the static member and the opening 224 of the body member 12 are substantially aligned with each other in the connected position, as shown in FIGS. 6 and 7. However, it is also feasible to fluidly connect the channel 276 of the actuating member 260, the channel 284 formed in the static member and the opening 224 of the body member 12 without configuring said channels to be aligned with each other in the connected position. For instance, the opening 224 and the channel 284 may be offset from each other, i.e. not aligned, and the channel 276 may extend at an angle to the longitudinal axis of the body member 12 to fluidly connect the opening 224 and the channel 284 in the connected position to provide a fluid connection between the vacuum chamber 16 and the lumen 30 of the rod member 26 and thus to the suction head 48.

To switch the actuating member 260 form the disconnected position to the connected position, the actuating member 260 is displaced substantially perpendicular to the longitudinal axis of the body member 12 and/or the rod member 26. The channel 276 formed in the actuating member 260 is thereby also displaced substantially perpendicular to the longitudinal axis of the body member 12 and/or the rod member 26.

Thus, as the channel 276 formed in the actuating member 260 fluidly connects the opening 224 of the body member 12 and the channel 284 formed in the static member 262, the actuating member 260 and the channel 276 is displaced substantially perpendicular to the longitudinal axis of the body member 12 and/or the rod member 26 to fluidly connect the opening 224 of the body member 12 and the channel 284 formed in the static member 262.

As the actuating member 260 is displaced substantially perpendicular to the longitudinal axis of the body member 12 and/or the rod member 26 from the connected position back to the disconnected position, the channel 276 formed in the actuating member 260 is displaced such that the channel is no longer in fluid connection with the opening 224 of the body member 12 and the channel 284 formed in the static member 262. In this position, the channel 276 is arranged offset relative to the channel 284 and to the opening 224. Thus, in the disconnected position, the vacuum chamber 16 and the lumen 30 of the rod member 26 are not fluidly connected via the opening 224 of the body member 12, the channel 276 of the actuating member 260 and the channel 284 formed in the static member 262.

More generally speaking, in the embodiments of FIGS. 1 to 7, the connected position is achieved by having a first portion of the channel 76, 176, 276 in the actuating member 60, 160, 260 (e.g., a proximal portion or opening of the channel 76, 176, 276) at least partially overlap with a channel that is in fluid connection with the vacuum chamber 16 (in the exemplary embodiment of FIGS. 4 to 7, with the opening 124, 224; in FIGS. 1 to 3 with the channel 94) and having a second portion of the channel 76, 176, 276 in the connecting member 60, 160, 260 (e.g., a distal portion or opening of the channel 76, 176, 276) at least partially overlap with a channel that is in fluid connection with the suction head 48 (e.g., with the lumen 30 of the rod member 26 or with a channel 98, 184, 284 that is fluidly connected with said lumen 30 of the rod member 26). In the connected position, as shown in FIGS. 4 to 7, a first seal member 80 preferably is arranged around the first portion and a second seal member 80 preferably is arranged around the second portion of the channel 176, 276, thus preventing ambient air from entering where the channels overlap. However, the sealing may also be achieved in a different manner (see, for example, FIGS. 1 to 3)

The disconnected position is preferably achieved by avoiding the above-mentioned overlap of the first and/or second portion of the channel 76, 176, 276 with the channel fluidly coupled to the vacuum chamber 16 and/or the channel fluidly coupled to the suction head 48, respectively (see, for example FIG. 7). In the disconnected position, one of the seal members 80 may be arranged around the channel fluidly coupled to the vacuum chamber 16 and seal against a surface of the actuating member 60, 160, 260, thus preventing ambient air from entering the vacuum chamber 16. The channel that is fluidly coupled with the suction head 48 may be connected to the surrounding environment to release vacuum provided therein, e.g. by arranging the second seal member 80 such that it is moved away from this channel (see, for example, FIG. 7) and/or by providing a further pressure relief channel (not shown) in the actuating member 160, 260 that is fluidly connected with the suction head 48 when the actuating mechanism is moved into the disconnected position.

In the embodiment of FIGS. 4 and 5, the actuating member 160 is rotated to move the channel 176 between the connected and disconnected positions (in the example shown, the rotation occurs around the longitudinal axis of the rod member 26 and/or of the body member 12, but also another axis may be chosen). In the embodiments of FIGS. 1 to 3, 6 and 7, the actuating member 60, 260 is slid to move the channel 76, 176 between the connected and disconnected positions.

FIGS. 8 to 12 show alternative embodiments of a locking mechanism 364, 464 of a handheld gynecological device 310, 410. The devices 310, 410 may include any of the actuating mechanism discussed above with reference to FIGS. 1 to 7.

As may be seen from the Figures, the gynecological device 310, 410 comprises two slots arranged diametrically opposite from each other. The gynecological device 310, 410 thus also comprises two engaging elements 68, which are however not visible due to the cross-sectional view of FIGS. 8 to 12. Thus, the locking mechanism 364, 464 is described in the following based on the visible portion of the locking mechanism 364, 464 in FIGS. 8 and 10. The skilled reader will appreciate that one, two, or more slots and one, two, or more respective engaging elements may be employed in accordance with the principles disclosed herein.

Figure 8:
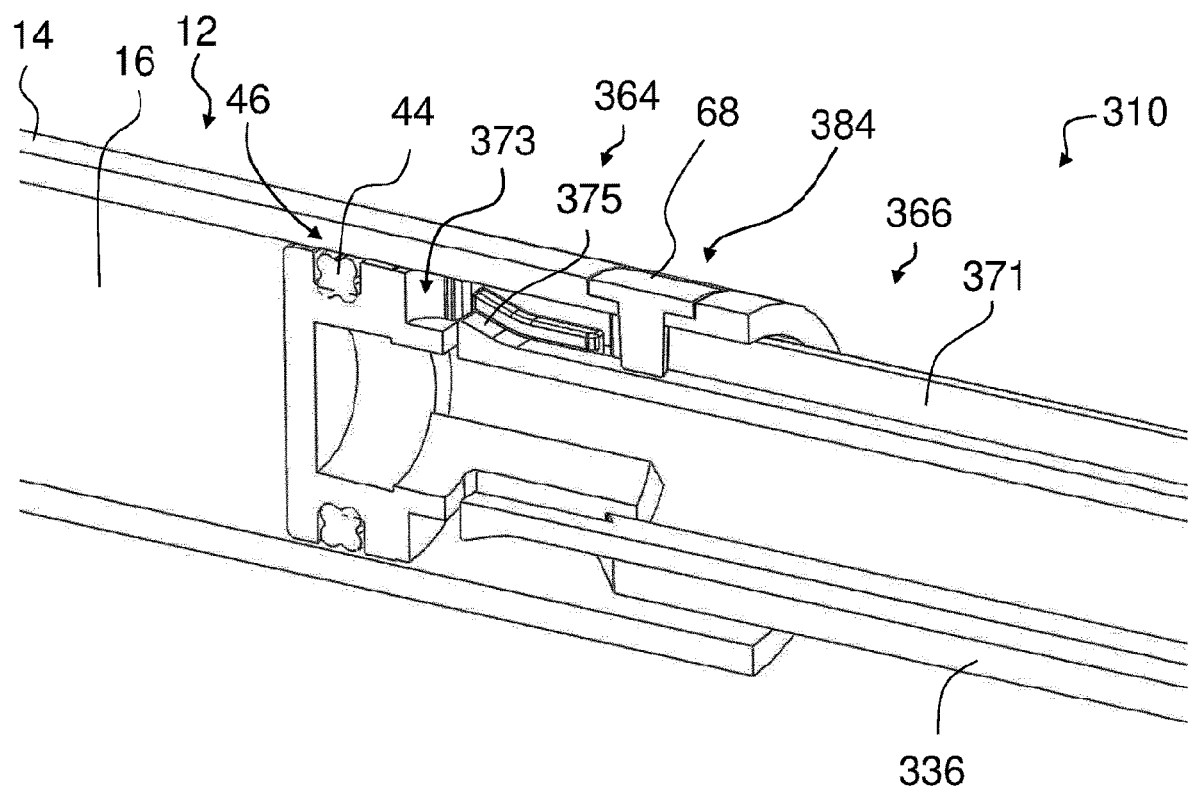
FIG. 8 shows a perspective cross-sectional view of a further embodiment according to the invention with an alternative locking mechanism in an unlocked position.
Figure 9:
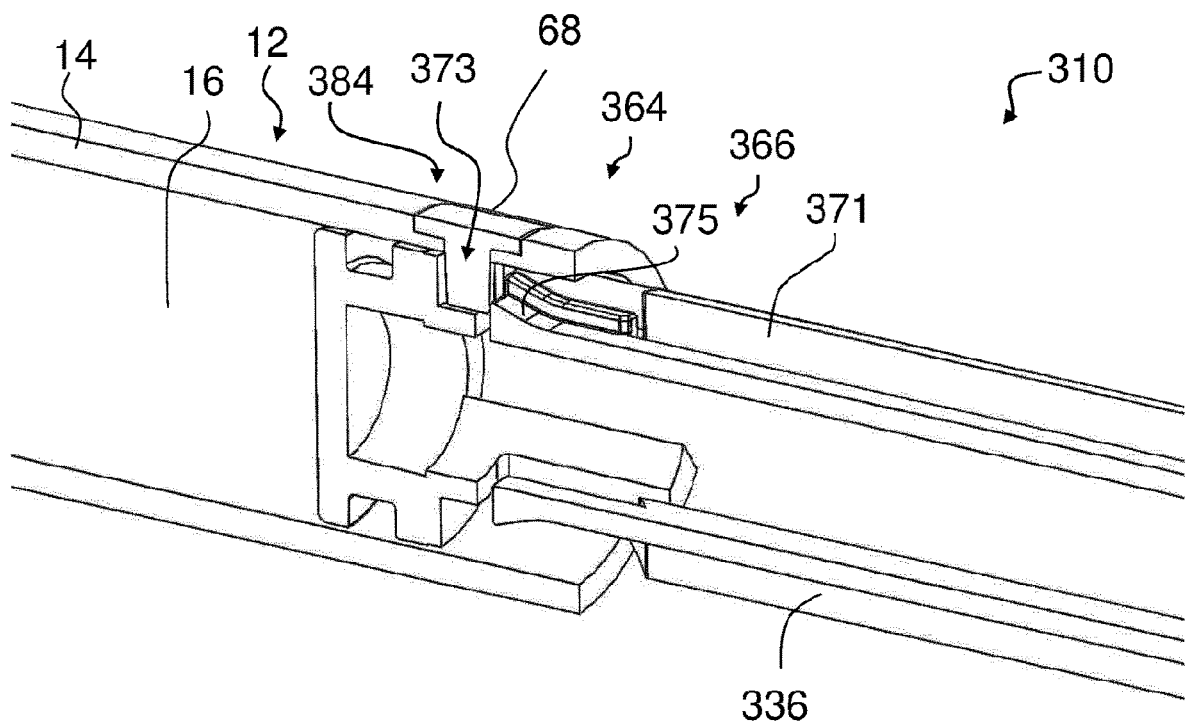
FIG. 9 shows the embodiment of FIG. 8 with the locking mechanism in a locked position.
Figure 10:
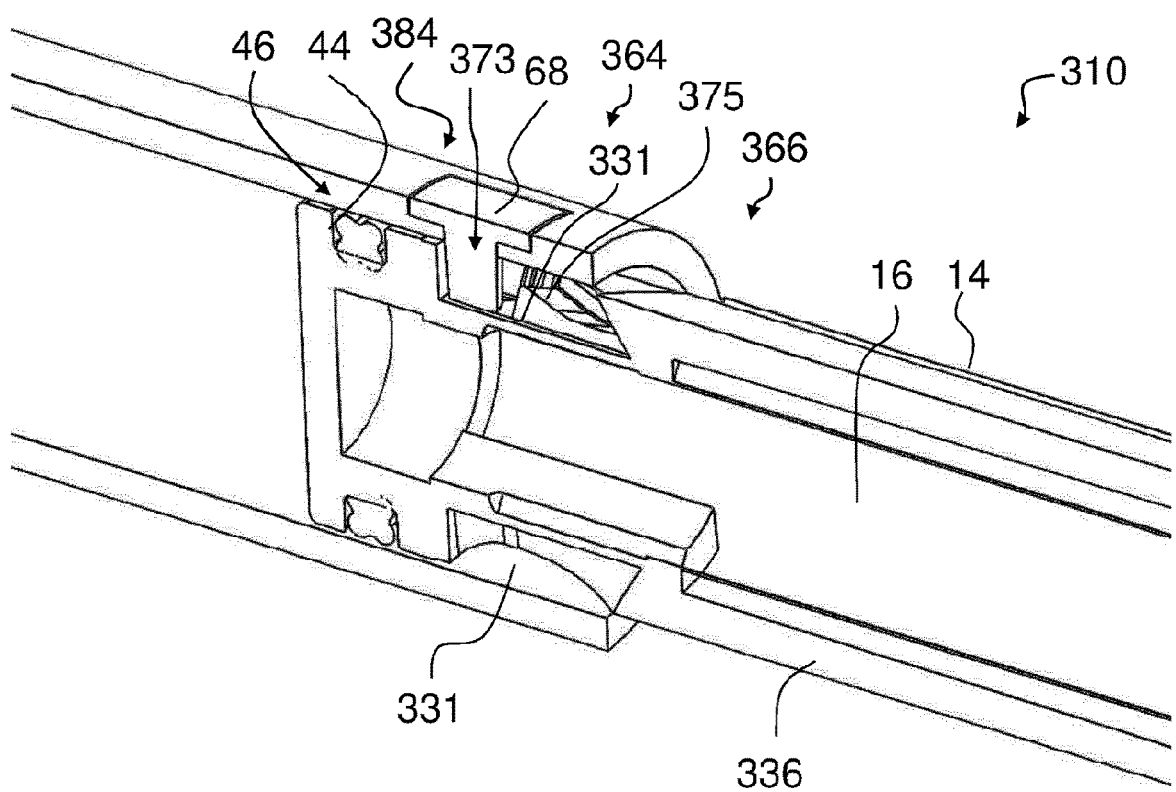
FIG. 10 shows the embodiment of FIGS. 8 and 9 with the locking mechanism being released.

In FIGS. 8 to 10, the locking mechanism 364 comprises a guiding section 371 similar or identical to the guiding section 71 shown in the embodiments of FIGS. 1 to 7. Also similar to the embodiments of FIGS. 1 to 7, the engaging element 68 may be at least partially received in an opening 384 formed in the wall 14 of the body member 12, with a portion of the engaging element 68 extending into an interior of the body member 12.

The embodiment according to FIGS. 8 to 10 differs from the embodiments shown in FIGS. 1 to 7 mainly in the configuration of the locking section, denoted as 373 in FIGS. 8 to 10.

Instead of providing a locking section extending substantially transversely to the guiding section 371 along a portion of the circumference of the piston member, as shown in embodiments of FIGS. 1 to 7, the embodiment according to FIGS. 8 to 10 comprises a deflectable locking structure 375 formed on the piston member 336 which is engagable with the engaging element 68.

As the piston member 336 is being displaced to the second position, the engaging element 68 and the deflectable locking structure 375 contact each other prior to reaching the second position. The force acting on the engaging element 68 and the deflectable locking structure 375 effected by the engaging element 68 contacting with the deflectable locking structure 375 causes the locking structure 375 to be deflected substantially perpendicular to the longitudinal axis of the body member 12 to allow the deflectable locking structure 375 to pass the engaging element 68.

Once the piston member 336 is in the second position, the deflectable locking structure 375 can at least partially return to its original, i.e. non-deflected, position and can retain the piston member 336 in the second position by engagement of the engaging member 68 and the deflectable locking structure 375. The engaging element 68 may thus be received in a locking section 373 in a self-activating manner, i.e. without having to actively, for instance by a force exerted by the user, manoeuvre the engaging element 68 to circumvent the locking structure, such as by rotating the piston member as described in connection with the embodiments shown in FIGS. 1 to 7.

In FIGS. 8 and 9, the deflectable locking structure 375 is configured as an arm or protrusion extending from a portion of the piston member 336 in a distal direction. The deflectable locking structure 375 is dimensioned such to allow deflection of the deflectable locking structure 375 without breaking the deflectable locking structure 375 or substantially permanently deforming the deflectable locking structure 375. However, the engaging element 68 may alternatively or additionally also be configured as a deflectable part.

For instance, the engaging element 68 may also be configured to allow deflection of the engaging element 68 without breaking the engaging element 68 or substantially permanently deforming it.

Moreover, the engaging element 68 and/or the deflectable locking structure 375 may be provided with an additional biasing element, such as a spring, to allow the engaging element 68 and/or the deflectable locking structure 375 to be deflected by compression of the detent element, for instance by compression of the spring, as the engaging element 68 and the deflectable locking structure 375 contact each other prior to reaching the second position. Once the piston member 336 is in the second position, the engaging element 68 and/or the deflectable locking structure 375 may at least partially return to its original, i.e. non-deflected position, by a restoring force provided by the biasing element, such as a spring force provided by the compressed spring, and acting on the engaging element 68 and/or the deflectable locking structure 375.

To return the piston member 336 to the first position, the slot 366 may comprise a maneuvering section 331, only rudimentarily shown in FIG. 10. To allow the engaging element 68 to pass the deflectable locking structure 375, the piston member 336 can be rotated about the longitudinal axis of the body member 12 such that the engaging element 68 is received in the maneuvering section 331. The maneuvering section 331 allows the engaging element 68 to bypass the deflectable locking structure 375 to allow the piston member 336 to return to the first position.

Once the engaging element 68 has bypassed the deflectable locking structure 375, the engaging element 68 may be received in the guiding section 371 to allow the piston member 336 to be guided back to the first position.

Figure 11:
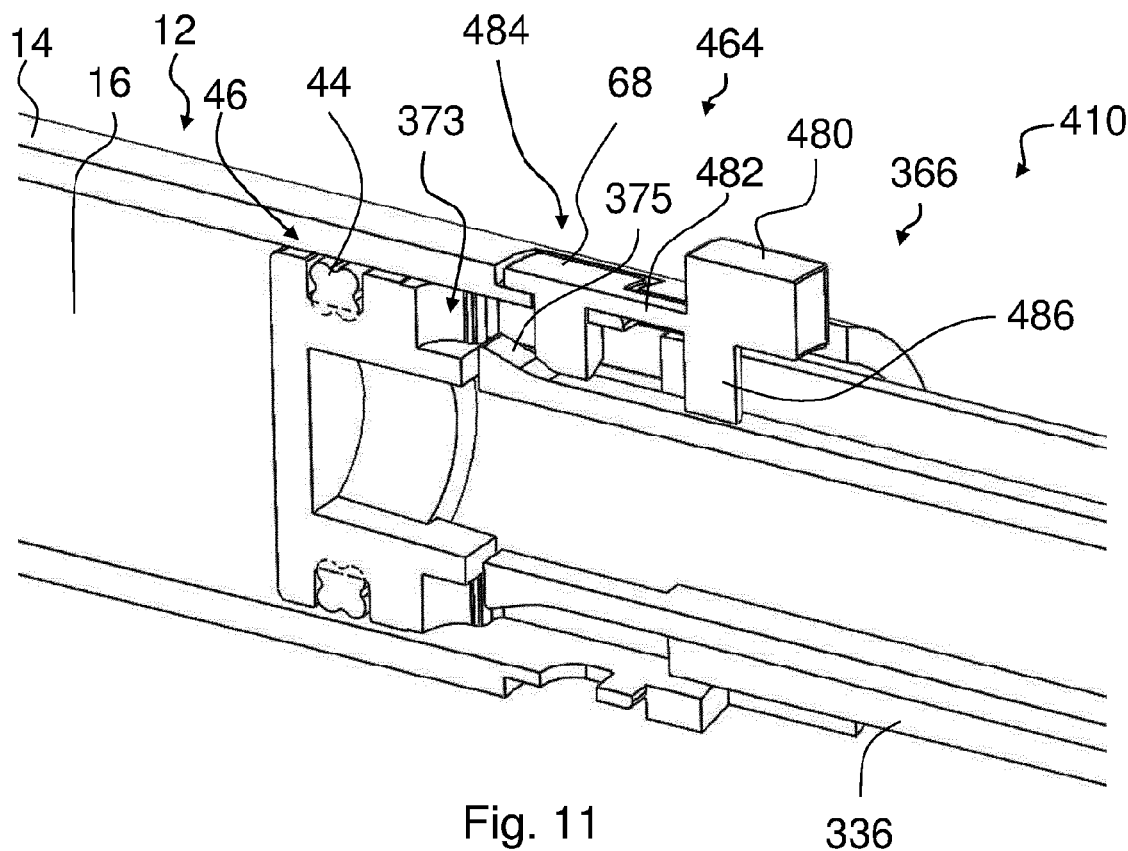
FIG. 11 shows a perspective cross-sectional view of another embodiment according to the invention with an alternative locking mechanism in an unlocked position.
Figure 12:
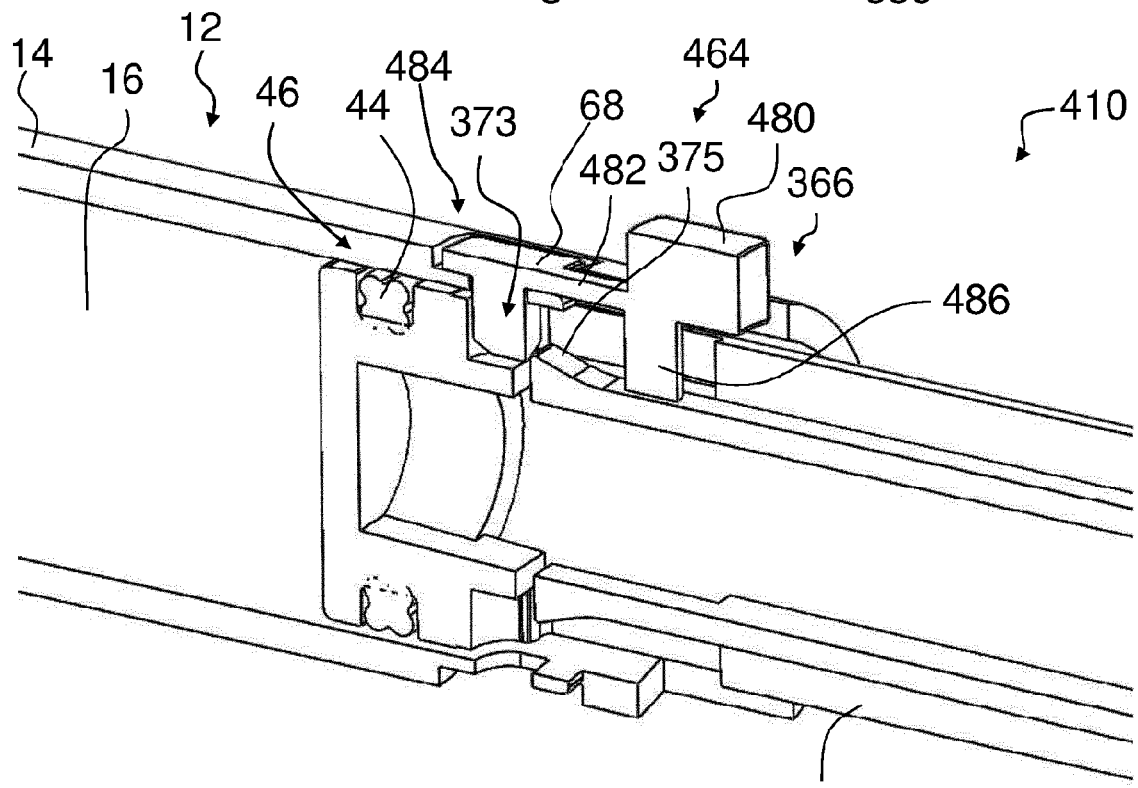
FIG. 12 shows the embodiment of FIG. 11 with the locking mechanism in a locked position.

FIGS. 11 and 12 show an alternative embodiment of a locking mechanism 464. According to FIGS. 11 and 12, the locking mechanism 464 comprises a disengaging actuator 480. The disengaging actuator 480 may, for manufacturing purposes, be connected to the engaging element 68 via a connection element 482. The disengaging actuator 480 may extend through an opening 484 formed in the wall 14 of the body member 12. Furthermore, the disengaging actuator 480 may further comprise a projection 486 configured to engage with the deflectable locking structure 375.

Thus, in order to release the locking mechanism 464 to allow the piston member 336 to be returned to the first position, the user can actuate the disengaging actuator 480 by exerting a pushing force thereupon. The projection 486 thereby engages the deflectable locking structure 375, deflecting the deflectable locking structure 375 perpendicular to the longitudinal axis of the body member 12. Thus, this allows the engaging element 68 to pass the deflectable locking structure 375 to enable the piston member 336 to return to the first position.

It is understood that the locking mechanisms 364, 464 shown in FIGS. 8 to 12 may be combined with any of the actuating mechanisms 58, 158, 258 shown in FIGS. 1 to 7.

However, the locking mechanisms 64, 364, 464 disclosed herein may also be implemented in a gynecological device independently from the actuating mechanisms disclosed herein. Instead, the locking mechanisms 64, 364, 464 may be combined with actuating mechanisms not disclosed herein or without an actuating mechanism altogether.

While the invention has been illustrated and described in detail in the drawings and foregoing description, such illustration and description are to be considered illustrative or exemplary and non-restrictive; the invention is thus not limited to the disclosed embodiments. Variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality and may mean "at least one".

The invention claimed is:

1. A handheld gynecological device for cervix handling, comprising:
   a body member defining a vacuum chamber and having a proximal end and a distal end;
   a piston member being at least partially received in the vacuum chamber and configured such that at least a portion of the piston member is displaceable in the vacuum chamber from a first position to a second position for creating a vacuum in the vacuum chamber;
   an actuating mechanism having an actuating member;
   a rod member having a proximal end and a distal end, the rod member defining a lumen and being configured to be coupled to the body member; and
   a suction head configured to engage at least a portion of a cervix of a patient, the suction head being fluidly connected to the distal end of the rod member and having a cross-section that is larger than a cross-section of the rod member;
   wherein the position of the rod member along the longitudinal axis of the body member is fixed relative to the body member when the rod member is coupled to the body member; and
   wherein the actuating member is coupled to the body member and/or the rod member and is configured to be switched from a disconnected position, in which the vacuum chamber of the body member is fluidly disconnected from the lumen of the rod member, to a connected position, in which the vacuum chamber of the body member is fluidly connected to the lumen of the rod member.

2. The handheld gynecological device according to claim 1, wherein the actuating member comprises a channel and the actuating member is switchable from the disconnected position to the connected position by being displaced relative to the body member and the rod member such that, in the disconnected position, the channel of the actuating member is sealed from the vacuum chamber and/or the lumen of the rod member, and, in the connected position, the channel fluidly connects the vacuum chamber of the body member to the lumen of the rod member.

3. The handheld gynecological device according to claim 2, wherein the actuating mechanism comprises a static member along which at least a portion of the actuating member is slidably arranged, wherein the static member comprises at least one channel formed therein.

4. The handheld gynecological device according to claim 3, wherein the channel of the static member is fluidly connectable to the channel formed in the actuating member by sliding the actuating member along the static member.

5. The handheld gynecological device according to claim 2, wherein the actuating mechanism comprises a static member having a channel formed in at least a portion thereof, wherein the channel of the static member and the channel of the actuating member are arranged offset relative to each other in the disconnected position, wherein the channel of the static member and the channel of the actuating member are fluidly connectable by rotating the actuating member relative to the rod member and/or the body member.

6. The handheld gynecological device according to claim 5, wherein the channel of the static member and the channel of the actuating member are fluidly connectable by rotating the actuating member relative to the rod member and/or the body member about a longitudinal axis of the rod member and/or about a longitudinal axis of the body member, and/or wherein the channel of the static member and the channel of the actuating member are arranged offset relative to the longitudinal axis of the rod member and/or the longitudinal axis of the body member.

7. The handheld gynecological device according to claim 2, wherein the actuating mechanism comprises a static member having a channel formed in at least a portion thereof, wherein the channel of the static member and the channel of the actuating member are arranged offset relative to each other in the disconnected position, wherein the channel of the static member and the channel of the actuating member are fluidly connectable by displacing the actuating member relative to the rod member and/or the body member substantially perpendicular to a longitudinal axis of the rod member and/or a longitudinal axis of the body member, and wherein the channel of the static member and/or the channel of the actuating member are arranged offset relative to the longitudinal axis of the rod member and/or the longitudinal axis of the body member.

8. The handheld gynecological device according to claim 1, wherein the vacuum chamber is fluidly connectable to the lumen of the rod member by displacing the actuating member axially along a longitudinal axis of the rod member and/or a longitudinal axis of the body member.

9. The handheld gynecological device according to claim 1, wherein the vacuum chamber is fluidly connectable to the lumen of the rod member by rotating the actuating member relative to the rod member and/or the body member.

10. The handheld gynecological device according to claim 9, wherein the vacuum chamber is fluidly connectable to the lumen of the rod member by rotating the actuating member relative to the rod member and/or the body member about a longitudinal axis of the rod member and/or a longitudinal axis of the body member or about an axis parallel therewith.

11. The handheld gynecological device according to claim 1, wherein the vacuum chamber is fluidly connectable to the lumen of the rod member by displacing the actuating member relative to the rod member and the body member substantially perpendicular to a longitudinal axis of the rod member and/or a longitudinal axis of the body member.

12. The handheld gynecological device according to claim 1, further comprising a locking mechanism configured to maintain the piston member in the second position.

13. The handheld gynecological device according to claim 12, wherein the locking mechanism comprises at least one slot formed in the piston member or the body member and at least one engaging element formed on or attached to the other of the piston member and the body member, wherein the engaging element is movably received in the slot.

14. The handheld gynecological device according to claim 12, wherein the slot comprises a guiding section configured to guide the engaging element when moving the piston member between the first position and the second position, and wherein the guiding section extends substantially parallel to a longitudinal axis of the body member.

15. The handheld gynecological device according to claim 12, wherein the locking mechanism comprises a locking structure providing a stop and/or undercut for the engaging element to maintain the piston member in the second position.

16. The handheld gynecological device according to claim 15, wherein the locking structure is formed as a locking section of the slot, the locking section extending substantially transversely to the guiding section of the slot and/or in a circumferential direction.

17. The handheld gynecological device according to claim 15, wherein the locking mechanism is actuated to maintain the piston member in the second position by rotating the piston member relative to the body member to engage the engaging element with the locking structure once the piston member is in the second position.

18. The handheld gynecological device according to a claim 15, wherein the engaging element is configured to bias the locking structure and the locking structure is configured to elastically recoil in order to engage the engaging element with the locking structure when the piston member is brought to the second position.

19. The handheld gynecological device according to claim 15, wherein the engaging element and/or the locking structure is deflectable.

20. The handheld gynecological device according to claim 19, wherein the engaging element and/or the locking structure is deflectable in a direction substantially perpendicular to a longitudinal axis of the rod member, while the piston member is being moved between the first position and the second position.

21. The handheld gynecological device according to claim 15, further comprising a disengaging actuator configured to disengage the engaging element from the locking structure by exerting a force on the disengaging actuator, thereby deflecting the engaging element.

22. The handheld gynecological device according to claim 21, wherein the disengaging actuator is deflected in a direction substantially perpendicular to a longitudinal axis of the rod member, to disengage the locking structure from the engaging element.

23. The handheld gynecological device according to a claim 15, wherein the engaging element is disengagable from the locking structure by rotating the piston member relative to the body member when the piston member is in the second position.

24. The handheld gynecological device according to claim 12, wherein the locking mechanism comprises at least two slots formed in the piston member or the body member and at least two engaging elements formed on the other of the piston member and the body member.

25. The handheld gynecological device according to claim 24, wherein the at least two slots and the at least two engaging elements are arranged diametrically opposed to each other.

26. The handheld gynecological device according to claim 1, wherein the rod member is substantially rigid, wherein the longitudinal axis of the rod member and the longitudinal axis of the body member coincide with each other, and/or wherein the rod member and/or the body member are substantially hollow cylinders.

27. The handheld gynecological device according to claim 1, wherein the gynecological device has a total length extending in the direction of the longitudinal axis of the rod member and wherein, when the piston member is in the second position, the total length is 70 cm or less.

28. The handheld gynecological device according to claim 1, further comprising an ambient opening fluidly connected to an ambient environment outside of the gynecological device and wherein the lumen of the rod member is fluidly connected to the ambient opening when the actuating member is in the disconnected position and wherein the lumen of the rod member is fluidly disconnected from the ambient opening when the actuating member is in the connected position.

* * * * *